Sept. 15, 1959 J. F. SMATHERS 2,904,159

PROPORTIONAL SPACING MECHANISM FOR TYPEWRITERS

Filed Nov. 4, 1955 17 Sheets-Sheet 1

INVENTOR.
JAMES FIELDS SMATHERS
BY
William Frederick Werner
ATTORNEY

PROPORTIONAL SPACING MECHANISM FOR TYPEWRITERS

Filed Nov. 4, 1955 17 Sheets-Sheet 2

INVENTOR.
JAMES FIELDS SMATHERS
BY
William Frederick Wemer
ATTORNEY

Sept. 15, 1959 J. F. SMATHERS 2,904,159

PROPORTIONAL SPACING MECHANISM FOR TYPEWRITERS

Filed Nov. 4, 1955 17 Sheets-Sheet 3

INVENTOR.
JAMES FIELDS SMATHERS
BY
William Frederick Werner
ATTORNEY

Sept. 15, 1959 J. F. SMATHERS 2,904,159

PROPORTIONAL SPACING MECHANISM FOR TYPEWRITERS

Filed Nov. 4, 1955 17 Sheets-Sheet 4

INVENTOR.
JAMES FIELDS SMATHERS
BY
William Frederick Werner
ATTORNEY

Sept. 15, 1959 J. F. SMATHERS 2,904,159

PROPORTIONAL SPACING MECHANISM FOR TYPEWRITERS

Filed Nov. 4, 1955 17 Sheets-Sheet 5

INVENTOR.
JAMES FIELDS SMATHERS
BY
William Frederick Werner
ATTORNEY

Sept. 15, 1959 J. F. SMATHERS 2,904,159

PROPORTIONAL SPACING MECHANISM FOR TYPEWRITERS

Filed Nov. 4, 1955 17 Sheets-Sheet 6

INVENTOR.
JAMES FIELDS SMATHERS
BY
William Frederick Werner
ATTORNEY

Sept. 15, 1959 J. F. SMATHERS 2,904,159

PROPORTIONAL SPACING MECHANISM FOR TYPEWRITERS

Filed Nov. 4, 1955 17 Sheets-Sheet 7

*INVENTOR.*
JAMES FIELDS SMATHERS
*BY*
William Fredrick Werner
ATTORNEY

*INVENTOR.*

JAMES FIELDS SMATHERS

*BY* William Frederick Werner

ATTORNEY

PROPORTIONAL SPACING MECHANISM FOR TYPEWRITERS

Filed Nov. 4, 1955 17 Sheets-Sheet 9

INVENTOR.
JAMES FIELDS SMATHERS
BY
William Frederick Werner
ATTORNEY

Sept. 15, 1959 J. F. SMATHERS 2,904,159

PROPORTIONAL SPACING MECHANISM FOR TYPEWRITERS

Filed Nov. 4, 1955 17 Sheets-Sheet 10

INVENTOR.
JAMES FIELDS SMATHERS
BY
William Frederick Werner
ATTORNEY

Sept. 15, 1959 J. F. SMATHERS 2,904,159

PROPORTIONAL SPACING MECHANISM FOR TYPEWRITERS

Filed Nov. 4, 1955 17 Sheets-Sheet 11

INVENTOR.
JAMES FIELDS SMATHERS
BY
William Frederick Werner
ATTORNEY

PROPORTIONAL SPACING MECHANISM FOR TYPEWRITERS

Filed Nov. 4, 1955 17 Sheets-Sheet 12

INVENTOR.
JAMES FIELDS SMATHERS
BY
William Frederick Werner
ATTORNEY

INVENTOR.
JAMES FIELDS SMATHERS
BY
William Frederick Werner
ATTORNEY

PROPORTIONAL SPACING MECHANISM FOR TYPEWRITERS

Filed Nov. 4, 1955 17 Sheets-Sheet 14

INVENTOR.
JAMES FIELDS SMATHERS
BY
William Frederick Werner
ATTORNEY

PROPORTIONAL SPACING MECHANISM FOR TYPEWRITERS

INVENTOR.
JAMES FIELDS SMATHERS
BY
William Frederick Werner
ATTORNEY

INVENTOR.
JAMES FIELDS SMATHERS
BY
William Frederick Werner
ATTORNEY

Sept. 15, 1959 J. F. SMATHERS 2,904,159

PROPORTIONAL SPACING MECHANISM FOR TYPEWRITERS

Filed Nov. 4, 1955 17 Sheets-Sheet 17

INVENTOR.

JAMES FIELDS SMATHERS

BY

William Frederick Werner

ATTORNEY

United States Patent Office 2,904,159

Patented Sept. 15, 1959

2,904,159

PROPORTIONAL SPACING MECHANISM FOR TYPEWRITERS

James Fields Smathers, Poughkeepsie, N.Y.

Application November 4, 1955, Serial No. 545,063

56 Claims. (Cl. 197—84)

This invention relates to typewriting machines which imitate press-printing and more particularly it relates to an escapement which proportionally spaces in accordance with the different widths of the characters to be typed.

In machines of this class, the letter feeding movement of the typewriter paper-carriage is automatically varied in accordance with the widths of the characters to be typed.

The present invention advances the art over the patent to B. C. Stickney, #2,111,410 which issued on March 15, 1938; the patent to J. F. Smathers #2,385,035 which issued on September 18, 1945 and the patent to R. D. Dodge #2,547,449 which issued on April 3, 1951.

The Stickney patent supra is exemplary of the type of proportional carriage feed mechanism employing a toothed escapement wheel geared to the typewriter carriage and associated with a feed pawl and with a check pawl. In such escapements the feed pawl normally engages the wheel and in combination with a fixed stop holds the wheel and typewriter carriage in arrested position against the urging of the typewriter spring motor. The check pawl is normally out of engagement from the wheel. Typing operations result in the engagement of the check pawl with the wheel and the disengagement of the feed pawl therefrom.

These prior art feed pawl arrangements are such that upon disengagement from the wheel the feed pawl moves peripherally around the wheel to a set selector stop. When the selector stop is reached the feed pawl re-engages and the check pawl disengages the wheel thereby allowing the spring motor to rotate the wheel and feed pawl back to the fixed stop position. The purpose of the check pawl is to prevent the movement of the carriage while the feed dog is disengaged from the wheel. The check pawl in these arrangements is necessary because the inertia of the feed pawl structure is such that its intended action cannot be reliably completed before the carriage overcomes its own static inertia. The use of check pawls therefore retarded carriage movement and slowed typewriter operation.

In accordance with present invention a proportional escapement mechanism comprising a toothed escapement wheel is associated with a single pawl unit of closely associated parts having negligible inertia. Normally the single pawl unit in combination with a fixed stop holds the escapement wheel, and a typewriter carriage coupled thereto, in arrested position against the urging of a spring motor in the typewriter. A typing action forces the pawl member of the unit out of engagement whereupon the unit very rapidly travels peripherally around the escapement wheel to a set selector stop at which time it re-engages the wheel; the speed of travel of the pawl unit assuring re-engagement before the carriage can overcome its static inertia thereby eliminating the necessity for delaying carriage movement during its disengagement. A novel feature of the single pawl unit is a latching member intimately associated therewith for latching the pawl out of engagement from the wheel while it it travelling toward the set selector stops thereby insuring against premature re-engagement.

Very briefly the novel pawl unit comprises a pawl having a wheel engaging finger. The pawl is pivotally mounted on the center of the escapement wheel and adapted for radial movement whereby the finger may be forced out of engagement with the wheel. As will more clearly appear hereinafter, as the pawl moves radially outward it is latched out of engagement by the latching member which moves along with the pawl toward a set selector stop. The latching device strikes the selector stop and releases the pawl so that its finger re-engages the escapement wheel.

An object of the invention therefore is the provision of a proportional typewriter escapement which permits rapid and reliable operation of a typewriter.

An object of the present invention is to provide a proportional escapement mechanism having a single control pawl which is latched in position as it rotates concentrically to the periphery of the ratchet wheel.

Another object of the invention is to provide a simple, compact, reliable, efficient and fool proof means for regulating the variable letter-feeding movements of the carriage.

Another object of the invention is to provide an improved escapement mechanism capable of a wide variety of degrees of spacing to accommodate variations in the widths of the characters of a font of type.

Still another object of the present invention is to provide a variable spacing mechanism for regulating the letter-feeding movements of a typewriter carriage adapted for improving carriage control during tabulating, backspacing, and carriage return operations.

A further object of the invention, is to provide a variable spacing mechanism in which certain undesirable conditions arising during the return of the carriage and during tabulating operations are eliminated to enable more accurate margins and columns to be obtained and to insure more accurate and more positive arresting of the carriage in the left hand marginal position.

A still further object of the invention is to provide a proportional spacing power driven typewriter with a proportional escapement mechanism adaptable to decimal tabulation, a feature possible due to the employment of a single pawl in the proportional escapement mechanism.

Other objects and many of the attendant advantages of the present invention will be readily appreciated as the same becomes better understood by reference to the following detailed description when considered in connection with the accompanying drawings in which like refrence numerals designate like parts throughout the figures thereof and wherein.

*The frame*

Figure 1:
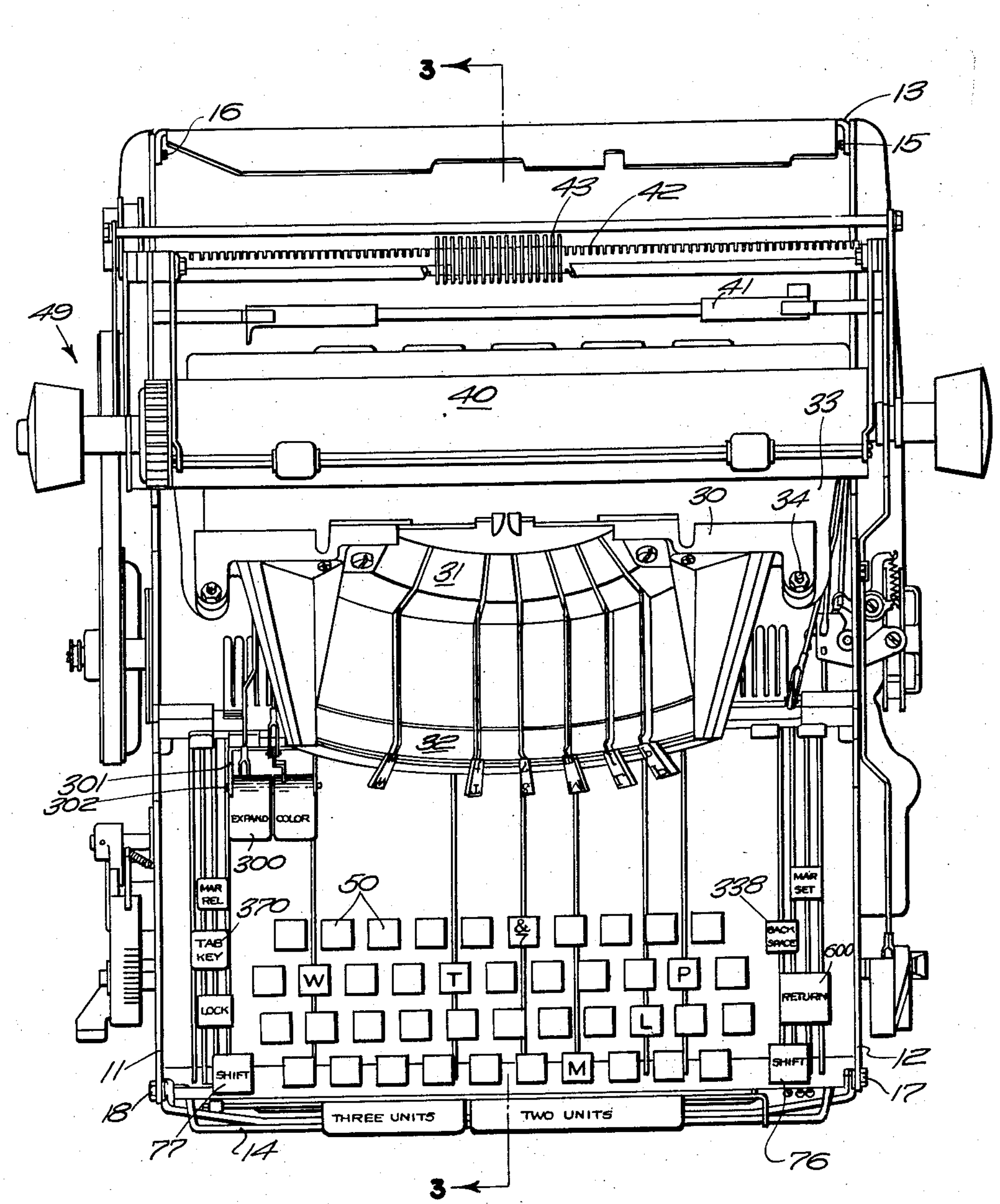
Figure 1 is a top plan view of the general type of power driven typewriter embodying the features of the present invention.
Figure 4:
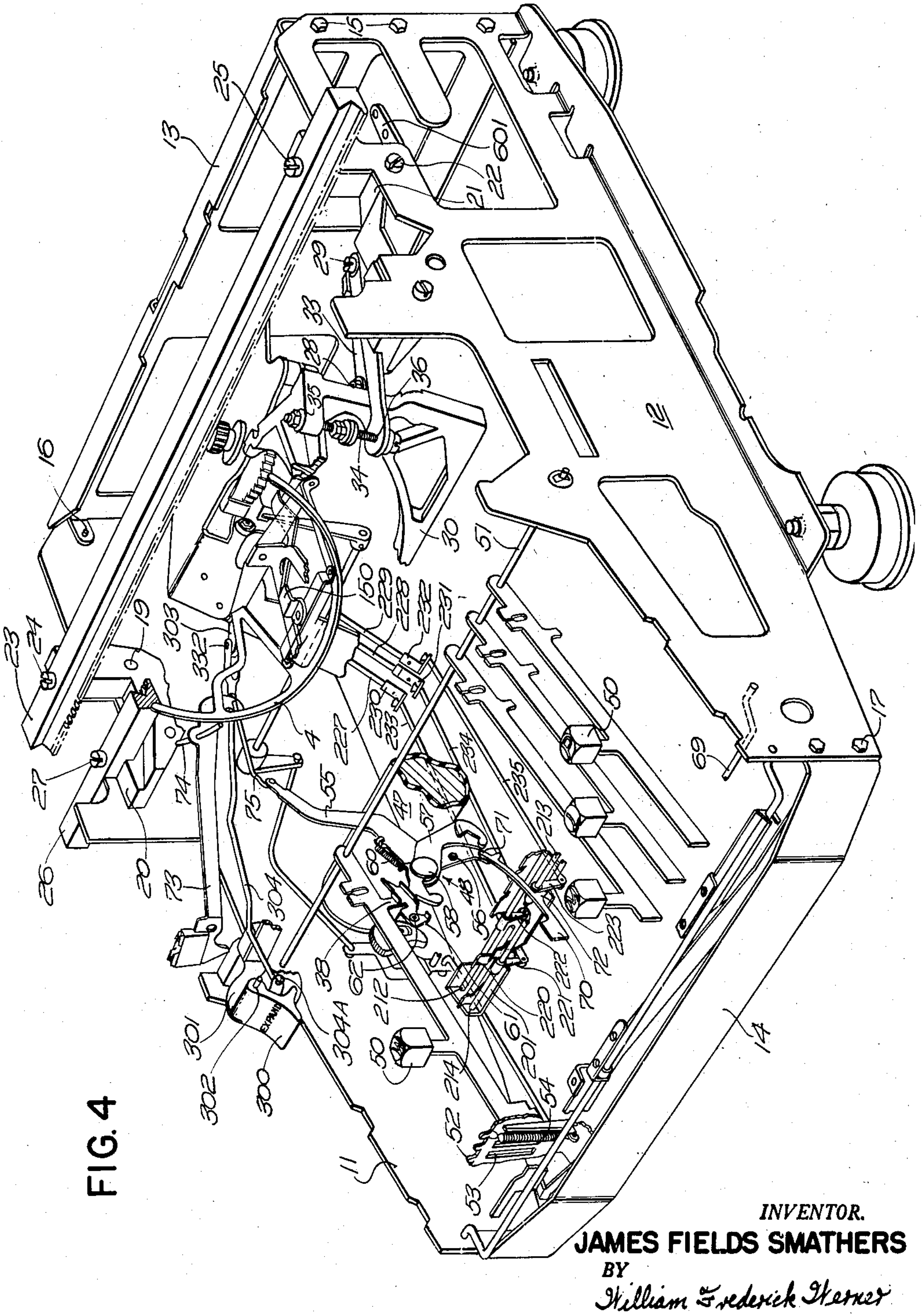
Figure 4 is a fragmentary perspective view of the machine frame, type keys and the power drive mechanism for the type bars.
Figures 5, 6, 7, 8, 27:
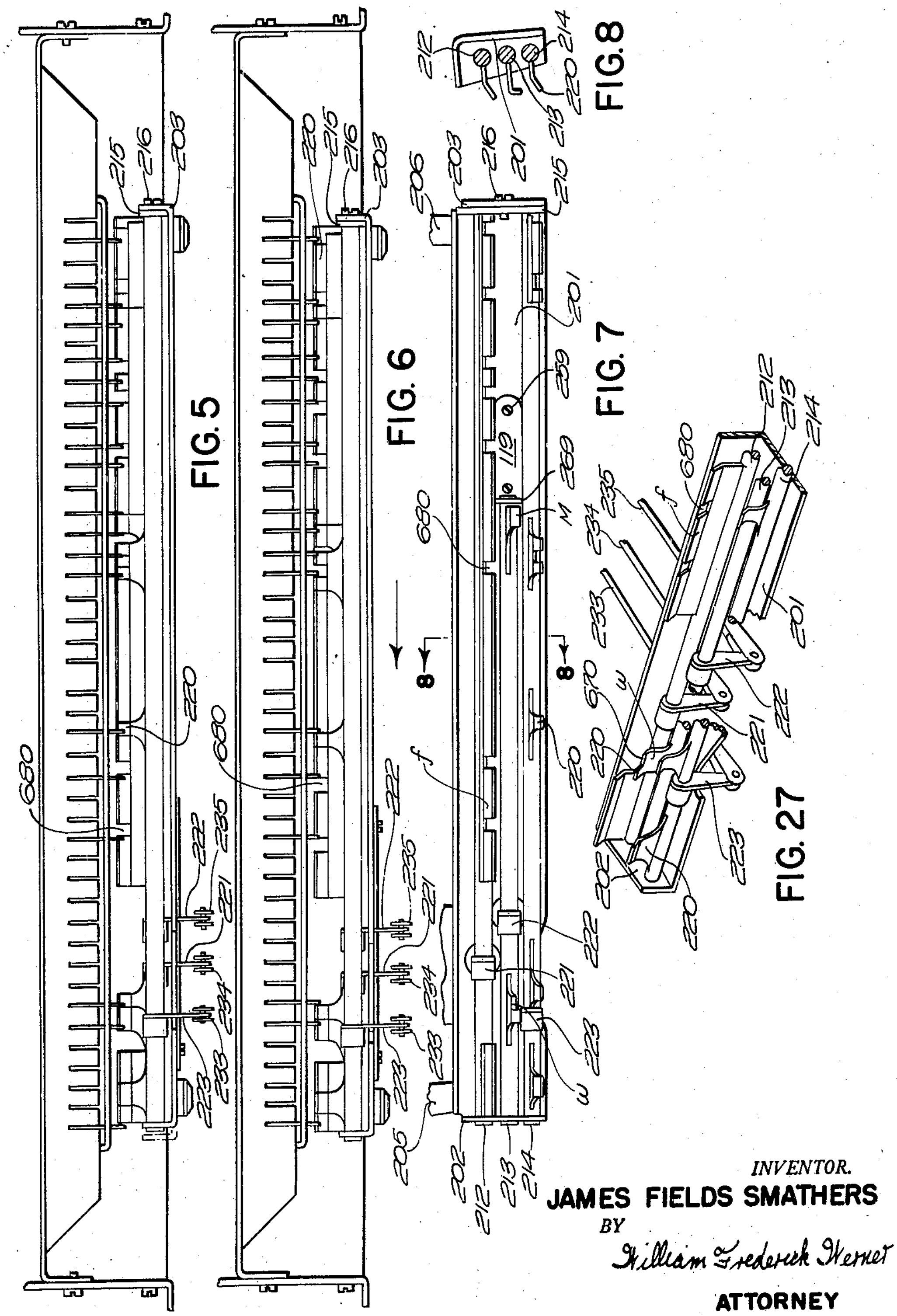
Figure 5 is a front elevational view showing the type bar selectors and the projections on the bail aligned with the selectors in lower case.
Figure 6 is a front elevational view similar to Figure 5 showing the projections on the bail aligned with the selectors in upper case.
Figure 7 is a bottom plan view of the bails.
Figure 8 is a side sectional view taken along line 8—8 of Figure 7.
Figure 27 is a fragmentary perspective view of the bails, and their connecting rods, shown in Figures 5, 6, 7 and 8.

The machine consists of a left side frame 11, a right side frame 12, a back frame 13 and a front frame 14 (Figures 1 and 4).

The back frame 13 is secured to the right side frame 12 through screws 15; back frame 13 is secured to left side frame 11 through screws 16; front frame 14 is secured to right side frame 12 through screws 17; and front frame 14 is secured to left side frame 11 through screws 18. A left hand bracket 20 is secured to left side frame 11 through screws 19 (Figure 4). A right hand bracket 21 is secured to right side frame 12 through screws 22. A back rail 23 is secured to left hand bracket 20 through screw 24 and to right hand bracket 21 through screw 25. A front rail 26 is secured to left hand bracket 20 through screw 27 and to right hand bracket 21 in like manner.

A segment 30 which comprises a type bar pivoting comb 31 and a type bar rest 32 (Figures 1, 3, and 4) is suspended and guided for up and down movement through right hand bracket 21. A flat spring 33 is secured on one end to said bracket 21 by means of a screw 29 and on the other end to segment 30 by means of a screw 28. A guiding stud 34 is fixed in segment 30 at 35 and is guided in bracket 21 at 36. In like manner segment 30 is suspended from left hand bracket 20.

A universal bar 4 is mounted for reciprocating movement in segment 30 in a manner well known to the art.

Figures 3, 26:
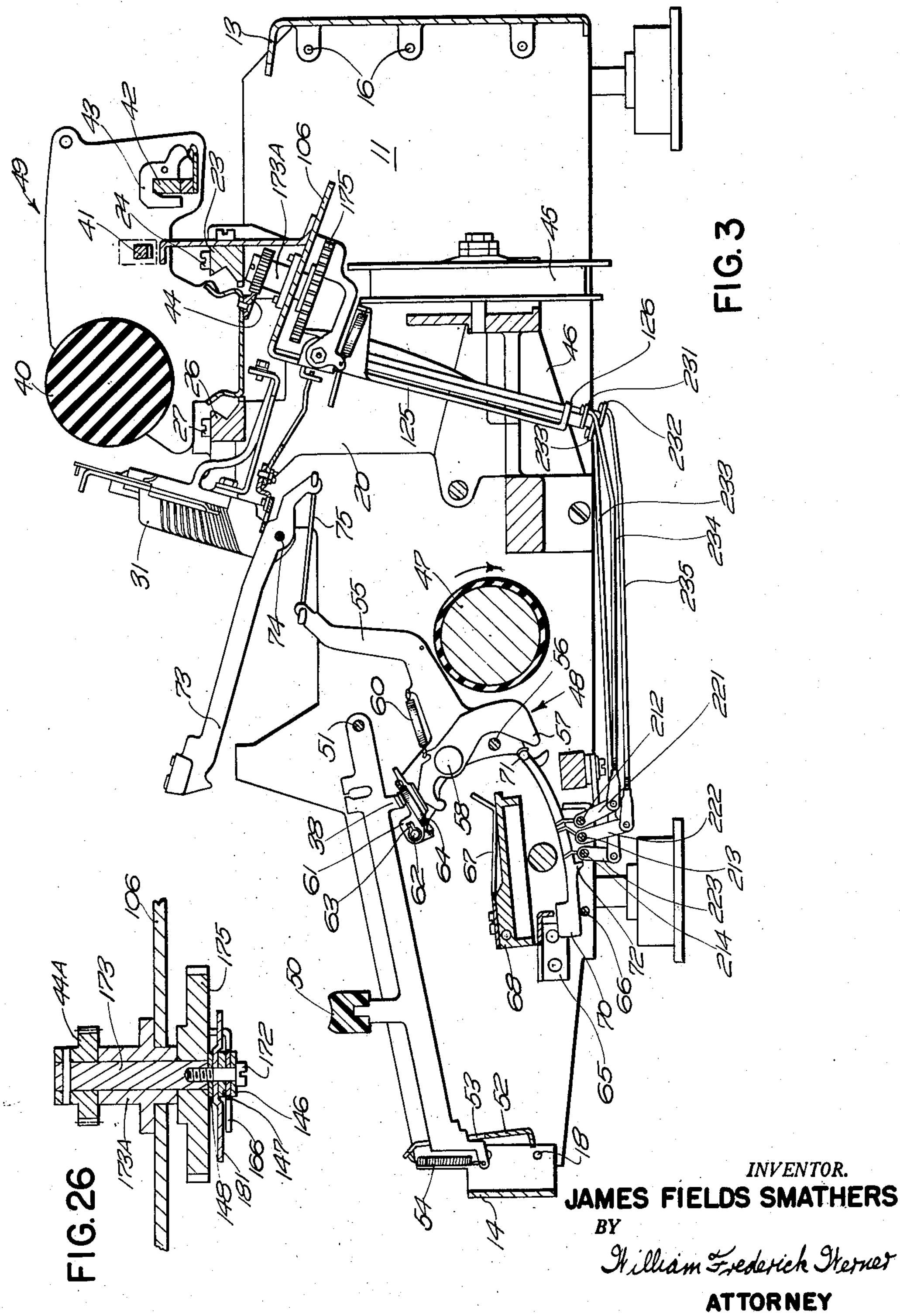
Figure 3 is a longitudinal sectional view taken along line 3—3 of Figure 1.
Figure 26 is a longitudinal sectional view taken through the escapement wheel shaft.

A conventional typewriter carriage generally indicated by reference character 49 is mounted for horizontal travel in front rail 26 and back rail 23 and is provided with the usual platen 40, marginal control bar 41, tabular bar 42 provided with tab stops 43 and feed rack 44 (see Figures 1 and 3). A spring motor 45 rotatively mounted in a bracket 46, which is secured on opposite ends to left side frame 11 and right side frame 12, is fixed to the typewriter carriage by means of a tape to urge it toward the left hand side of the machine.

A conventional power driven roller 47 mounted in left side frarme 11 and right side frame 12 in a manner well known in the art is provided to drive spring loaded cam 48 (one cam for each type bar) well known in the art and represented by United States Patent No. 1,600,-252 which issued on September 21, 1926, to J. F. Smathers.

The drawings represent the mechanism of the present invention as being associated with an International Business Machines Corporation, Executive Model, proportional escapement power driven typewriter. The description of the frame and conventional parts described above refers to that typewriter.

As hereinbefore stated this invention permits movement of the typewriter carriage in amounts determined by the differing widths of the characters to be typed though a novel escapement. The widths of the alpha, numeric and other character types are so designed that depending on which character operation is initiated the escapement will operate to measure out from two to five units of space. For example the widths of all the lower case alpha characters and numerals, with the exception of f, l, i, t, j, w and m are so designed as to require three units of space. Of the latter, the f, l, i, t and j require two, the w four, and the m five units of space.

All of the alpha upper case characters require four units of space with the exception of I, S, J, W and M. Of the latter I requires two, S and J require three, and W and M require five units of space.

The treatment of characters, other than alpha and numeric, of a standard font of type is similar, as for example the period, comma, and semicolon, require two spaces.

Because of the fact that the majority of the character widths require three units of space in lower case, or four in upper case the measurement of three units or four units of space, i.e. movement of the single pawl from a fixed stop to the three or four unit selector stop is normal for lower and upper case respectively. If more or less units of space are required as determined by the character to be typed, mechanism hereinafter to be more particularly described, is activated to interpose a two unit selector stop in the path of the pawl or to remove the three unit stop to enable a four or a five unit selector stop to be effective in stopping the pawl.

As seen in Figs. 1, 3 and 4, alpha, numeric and other character type keys 50 are pivotally mounted in their rear ends to a fulcrum-rod 51 which is secured on opposite ends to left and right side frames 11 and 12, respectively. A comb 52 is similarly secured and guides keys 50 in the slots 53 of the comb. Spring 54, one for each key 50, are fixed on one end to comb 52 and on the other end to keys 50. A projection 38 is integrally formed in each type key 50 for reasons which will hereinafter be apparent.

Cam levers 55 one for each type key are pivotally mounted on a rod 56 which is secured on opposite ends to left side frame 11 and right side frame 12, respectively.

Cams 57, one for each cam lever 55, are pivoted to their respective levers 55 as at 58. A spring 60, one for each cam lever 55 and cam 57, is suspended between its respective cam lever 55 and cam 57 to hold said cam 57 in a predetermined yielding position on cam lever 55.

Referring to Figure 3, sliding pawls 61 one for each cam lever 55 and cam 57 are provided with an elongated slot 63. A rivet 62 fixed in the cam lever 55 engages the elongated slot. A spring 64 fixed on one end to the cam lever 55 and on the other end to the sliding pawl 61, yieldingly holds the sliding pawl 61 between the type key 50 and the cam 57.

A selector comb 65 is secured on one end to left side frame 11 and on the opposite end to right side frame 12. A rod 66 beneath comb 65 is fixed on opposite ends in left side frame 11 and right side frame 12, respectively.

A cam stop 67 is fixed to a bracket 68 which is adjustably connected on opposite ends to left side frame 11 and right side frame 12, respectfully.

Selectors 70 one for each cam lever 55 which takes a spacing other than normal on the escapement wheel, is pivotally connected on one end as at 71 to a cam lever 55 and slidingly engages a slot in selector comb 65 while slidingly engaging rod 66. Rod 66 holds selector 70 in the comb slot. Predetermined selectors 70 are provided with hooks 72, for purposes presently to be described.

Type bars 73 are pivotally mounted in type bar pivoting comb 31 by means of fulcrum-rod 74 secured in pivoting comb 31. A connecting link 75 is pivotally connected on one end to type bar 73 and on the other end to the corresponding cam lever 55.

Figures 9, 28:
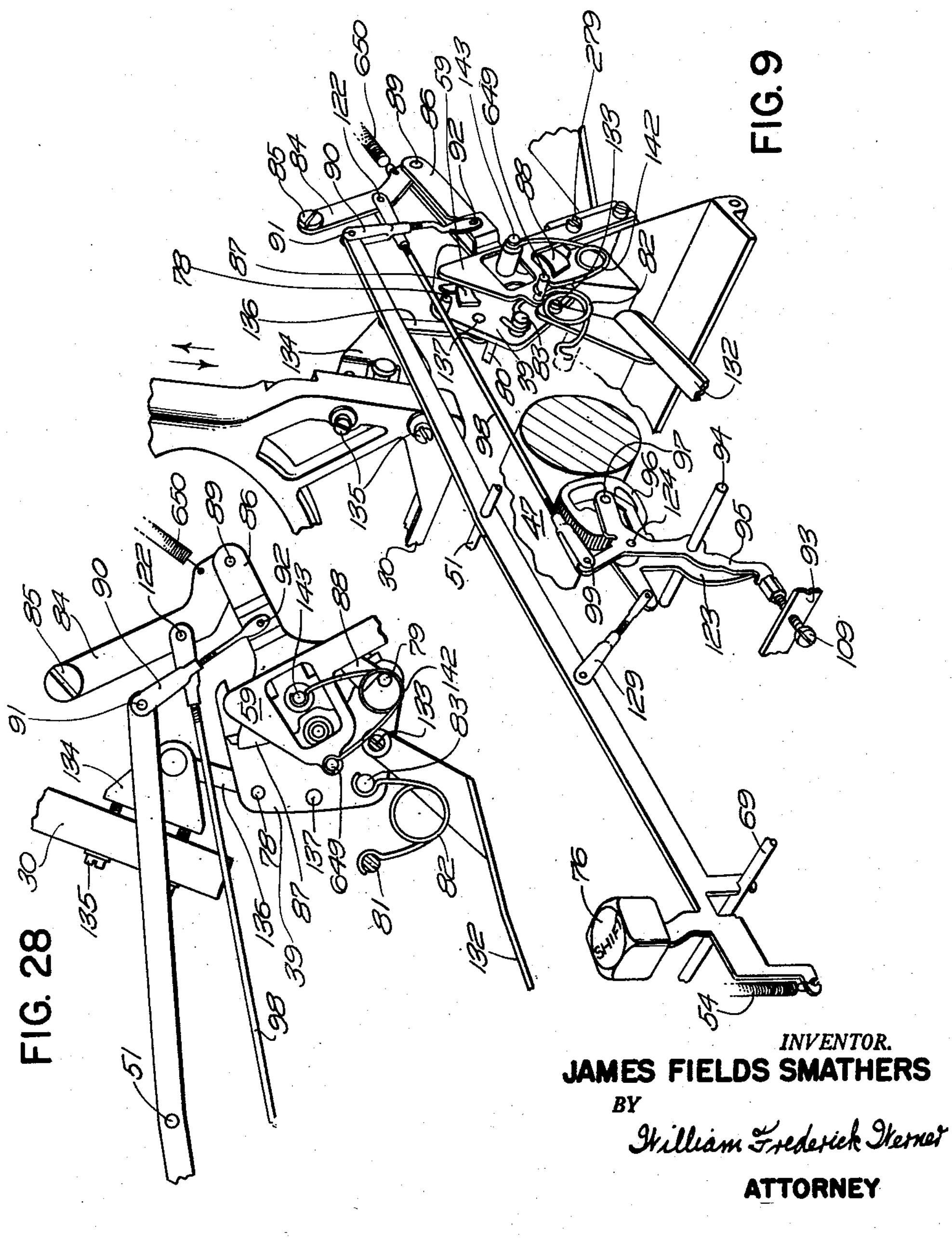
Figure 9 is a perspective view of the shift key and shift mechanism for shifting from lower to upper case.
Figure 28 is a fragmentary side elevational view of the mechanism shown in Figure 9.

The keyboard is provided with two shift keys 76 and 77 (Figure 1). A rod 69 (Figures 9 and 28) is pivotally mounted in left side frame 11 and right side frame 12. Shift key 77 is a dummy key which is operatively connected to shift key 76 through rod 69 so that depression of either shift key 76 or 77 depresses the other shift key.

Shift key 76 is pivotally mounted on rod 51. Spring 54 connects shift key 76 to comb 52. Shift toggle lever 39 having pins 78 and 79 is pivotally mounted on a shaft 80 fixed in the frame of the machine. A stub shaft 81, secured in the machine frame, anchors a spring 82 secured to shift toggle lever 39 at 83. A link 84 is pivotally connected to the machine frame by means of screw 85. A pusher lever 86 provided with arms 87, 88 is pivotally connected to link 84 at 89. A clevis rod 90 is connected at 91 to shift key 76 and at 92 to pusher lever 86. A bracket 93 is fixed on opposite ends to left side frame 11 and right side frame 12. A rod 94 upon which is pivotally mounted cam yoke 95 and the cam yokes for the carriage return key and back spacer key is mounted in the machine frame. A half revolution cam 96 is pivotally mounted at 97 to cam yoke 95. A clevis rod 98 is pivotally connected to cam yoke 95 at 99 and to link 84 at 122. A cam release housing 123, pivotally mounted on rod 94 and connected to cam yoke 95 at 124, is pivotally connected through clevis rod 129 to shift key 76. A link 132 is pivotally connected to shift toggle lever 39 by means of a shoulder screw 133. An abutment screw 109 is housed in bracket 93 and engages cam yoke 95. A bracket 134 secured to segment 30 by means of screws 135 is pivotally connected through link 136 to shift toggle lever 39. A link 136 is pivotally connected to lever 39 at 137. A buffer member 59 is connected to the machine frame by means of screws 279. A spring 142 is connected on one end to post 143 which is fixed in pusher lever 86. Spring 142 is fixed on the other end to buffer member 59 at 649. A spring 650 is secured on one end to link 84 and on the other end to the frame of the machine.

In operation, shift key 76 is depressed, tensioning spring 54, pivoting on rod 51 and lifting pusher lever 86 so that arm 87 lies behind pin 78. The lifting of pusher lever 86 causes clevis rod 98 to force cam 96 into engagement with power roller 47. The engagement of cam 96 against power roller 47 causes clevis rod 98 to draw pusher lever 86 forward where arm 87 pushing against pin 78 causes shift toggle lever 39 to pivot around shaft 80 and thereby raise segment 30 (Fig. 28) through link 136. At the same time link 132 is actuated for purposes later to be described. The lifting of segment 30 positions the type bars 73 in position to print upper case or capital letters.

When the finger, depressing shift key 76 is removed from said key, spring 54 restores shift key 76 to normal or raised position. The raising of shift key 76 causes cam release housing 123 through clevis rod 129 to force cam 96 into engagement with power roller 47 to push lifting pusher lever 86 back to normal position. In so doing arm 88 pushes pin 79 to pivot shift toggle lever 77 on stub shaft 80 whereby segment 30 through link 78 is placed in lower case position.

This mechanism and action is well known in the art and is generally similar to the mechanism represented in the patent to R. D. Dodge, #2,517,989. Applicant has added link 132 for purposes which will hereinafter appear.

*Proportional escapement*

Figure 10:
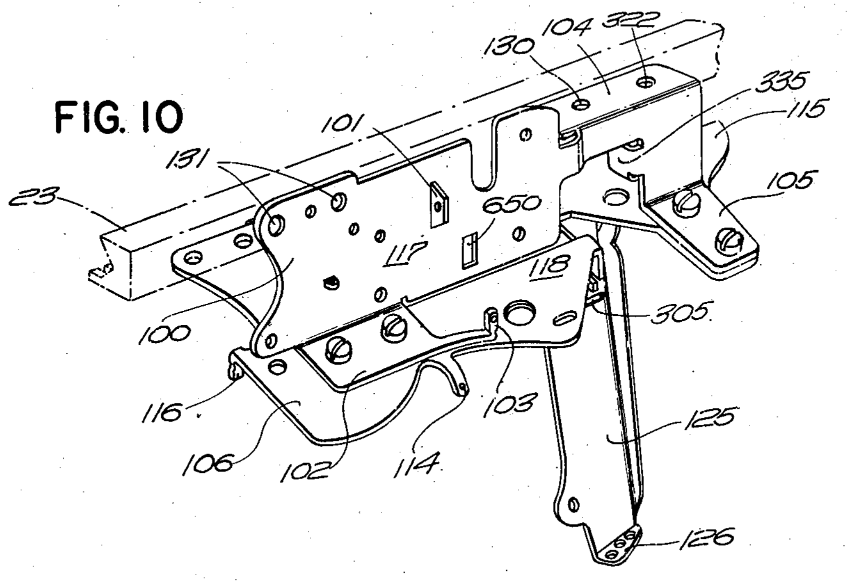
Figure 10 is a perspective view of the bracket which holds the new and improved escapement mechanism.
Figure 11:
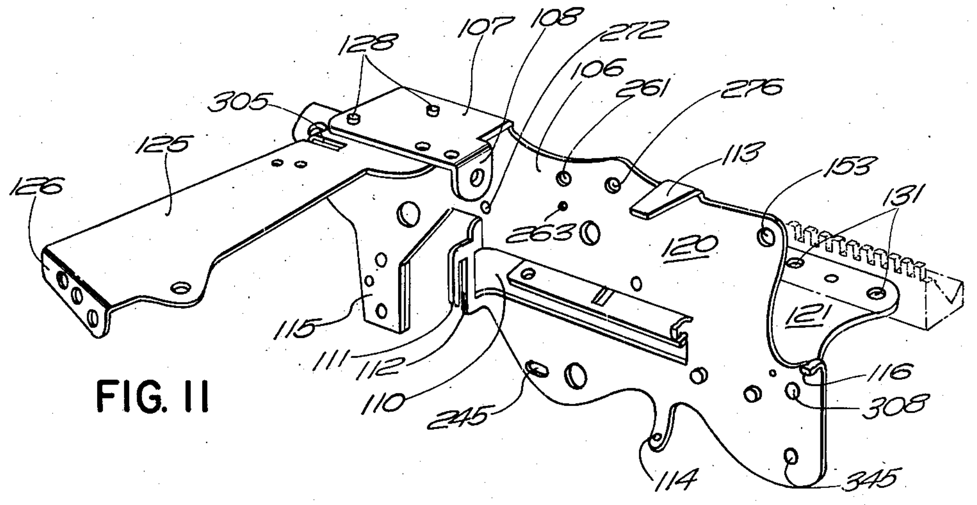
Figure 11 is a perspective view similar to Figure 10 viewed from a different direction.
Figures 12, 13, 14, 15, 16:
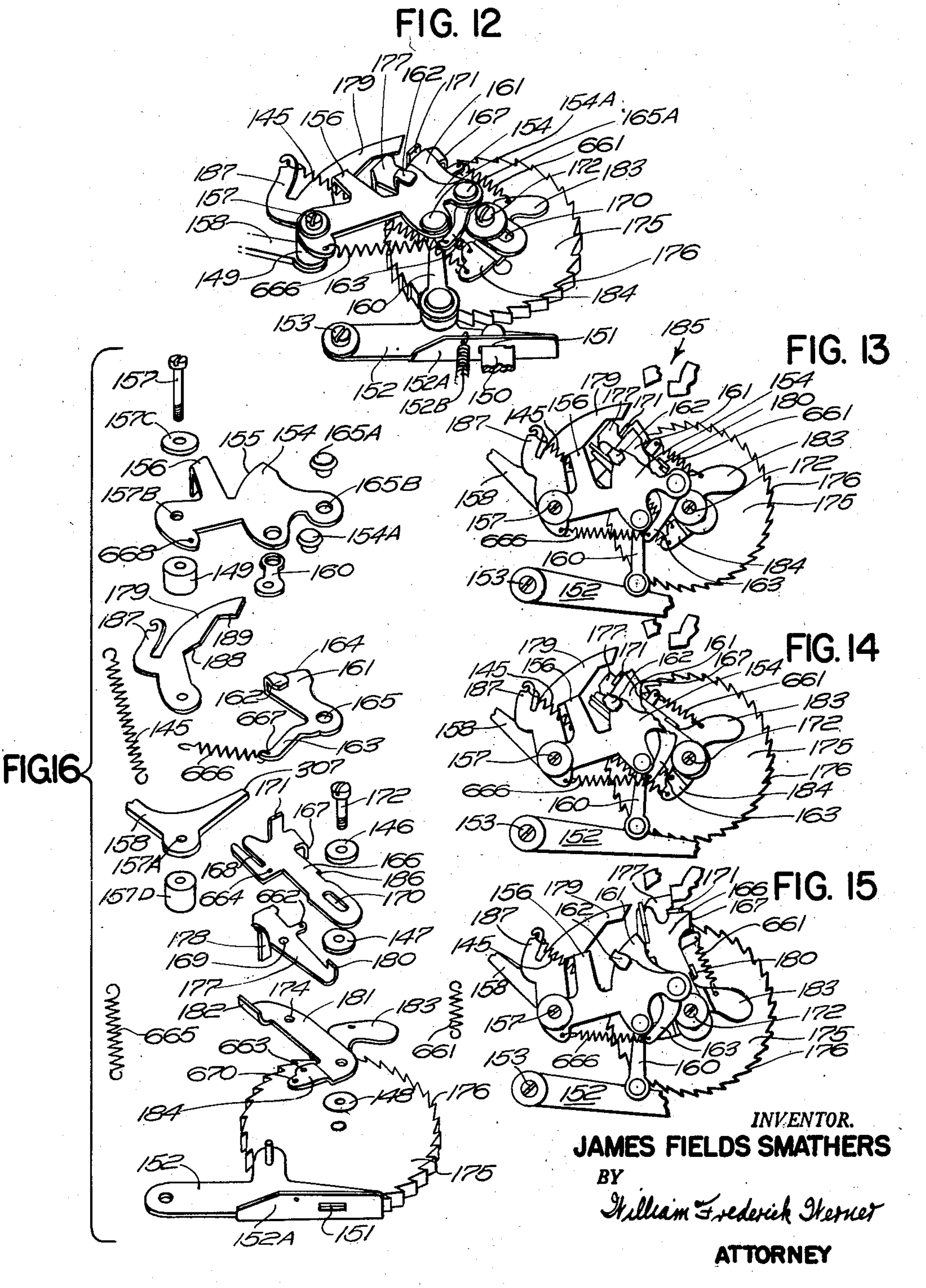
Figure 12 is a perspective view of the new and improved escapement wheel and escapement mechanism showing the single pawl and latching mechanism in normal position.
Figure 13 is a plan view of the escapement mechanism showing the various parts in a slidably different position from that shown in Figure 12.
Figure 14 is a plan view of the escapement mechanism similar to Figure 13 showing the latch locking the pawl in position for tooth selecting travel.
Figure 15 is a plan view similar to Figure 13 but showing the pawl unlatched in tooth engagement against a selected stop.
Figure 16 is a perspective exploded view showing the detailed parts which comprise the new escapement mechanism as shown in Fig. 12.

Part of the novelty of the present invention resides in the unique structure housing the new and improved proportional escapement mechanism (Figures 10 and 11). That structure consists of a plate 100, provided with an ear 101 and a projection 102 integrally formed at one corner of plate 100. A hook 103 extends from projection 102. The opposite corner of plate 100 is integrally formed into a back rail engaging surface 104 and a leg 105.

A platform 106 is provided with a base 107 having an ear 108. Platform 106 is also provided with a window 110, a hook 111 having a slot 112, a lug 113, a thumb 114, an extension 115 and a projection 116.

Figure 19:
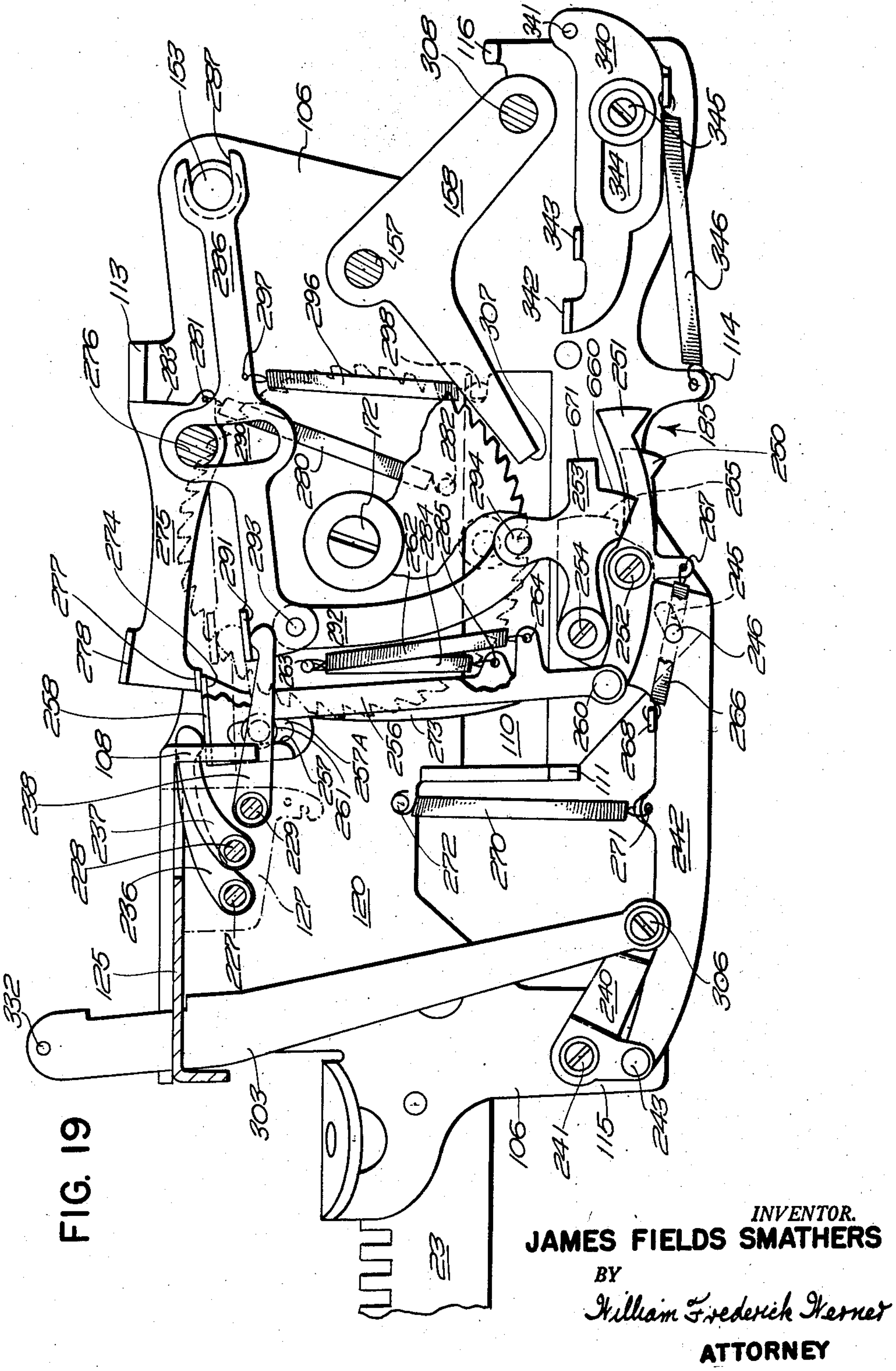
Figure 19 is a plan view of the escapement wheel and bracket showing the stops which co-operate with the single pawl.
Figures 20, 29:
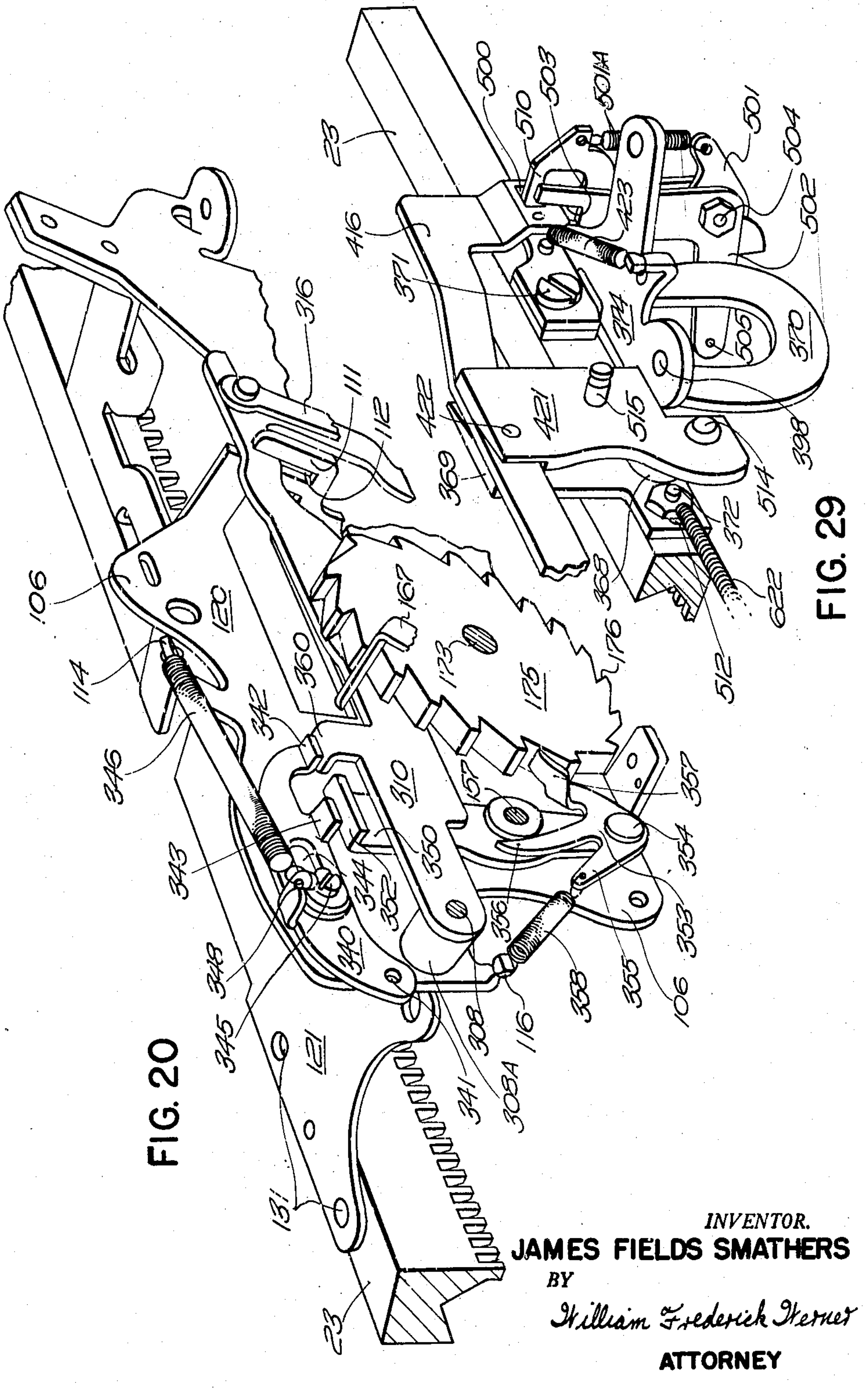
Figure 20 is a perspective view of the back spacing mechanism.
Figure 29 is a fragmentary perspective view of the right hand end of the back rail as shown in Figure 21.
Figure 21:
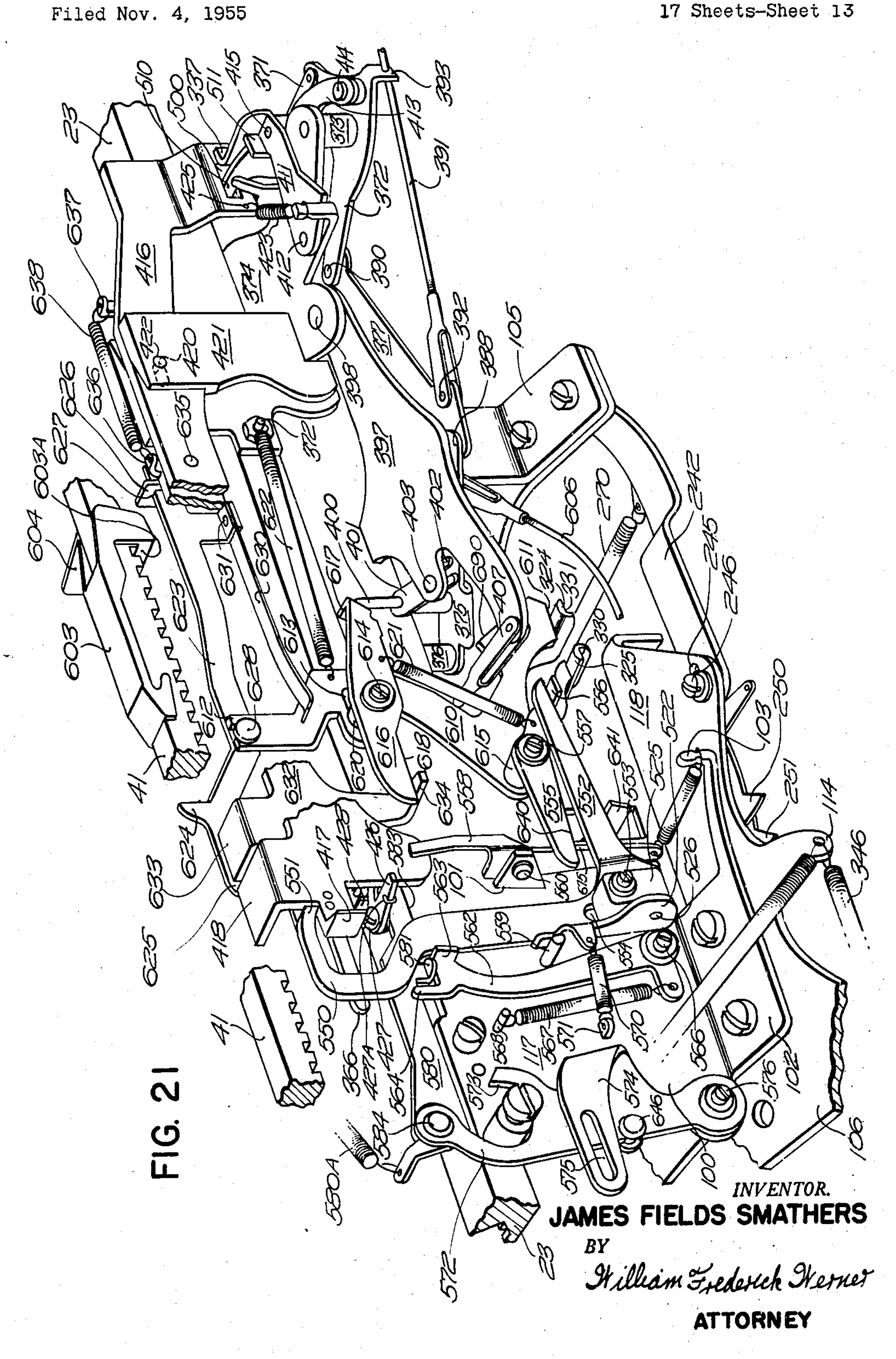
Figure 21 is a perspective view of the mechanism comprising the carriage return and margin control.

For purposes of clarity throughout the several views plate 100 and platform 106 will be identified with faces. In Figure 10 plate 100 features a view of face 117 and platform 106 features a view of face 118. In Figure 11 the back of face 118 is seen as face 120 and the back of face 117 is seen as face 121. In Figure 19 face 120 is seen. In Figure 20 faces 120 and 121 are seen. In Figure 21 faces 117 and 118 are seen.

Figures 25, 32:
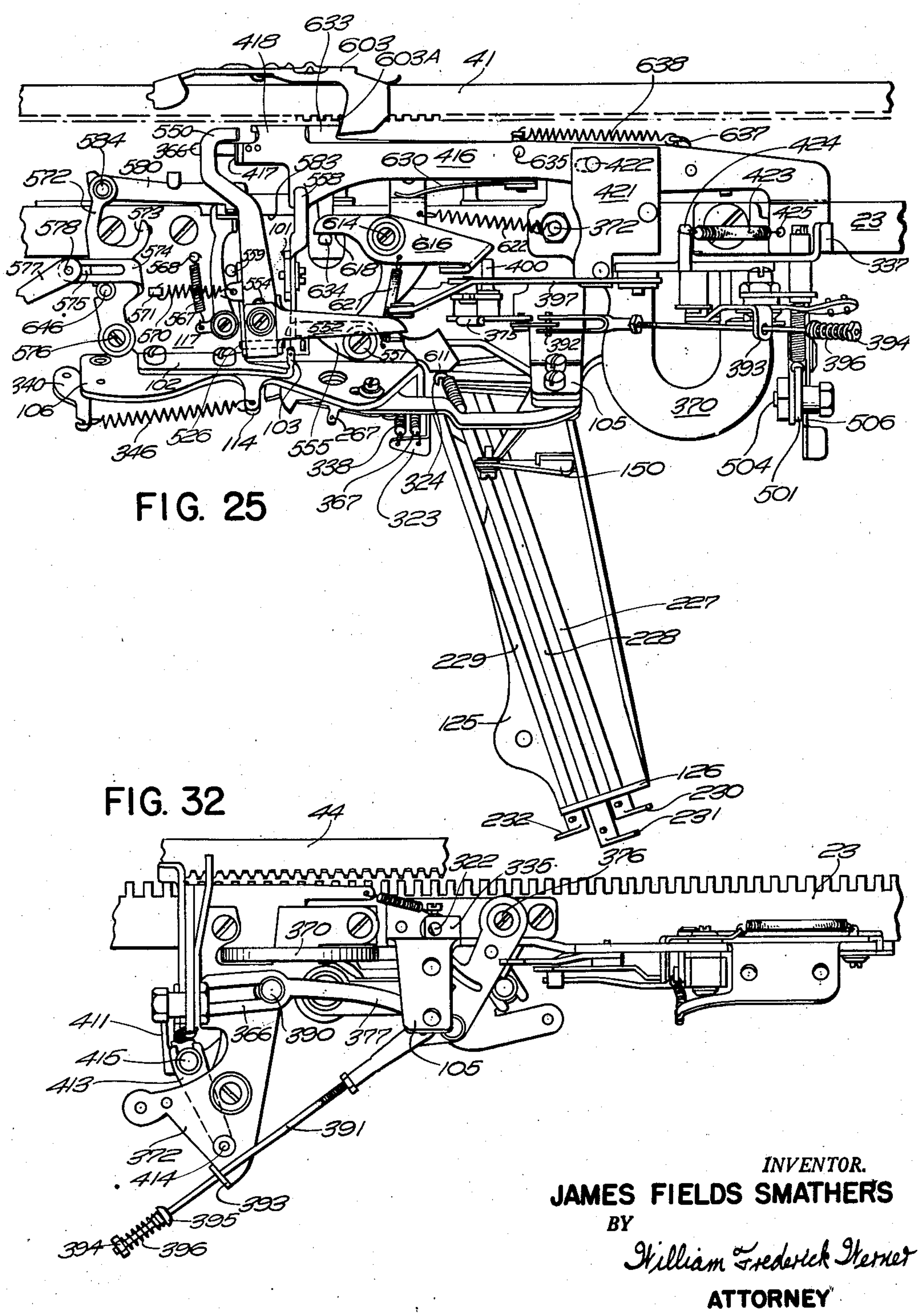
Figure 25 is a back elevational view of the mechanism shown in Figure 21.
Figure 32 is a fragmentary bottom plan view of Figure 21.

A bracket 125 having opposite ends formed into ears 126 (Figures 11 and 25) and 127 (Figure 18) is fixed to base 107 by means of screws 128.

Plate 100, through screws which pass through screw holes 130 and 131, is secured to back rail 23 (Figure 10).

An escapement lever 152 having an upturned lateral side 152A is pivotally mounted by means of a stud 153 to platform 106 (Figures 2, 12, 17 and 18). A collar 159 surrounding stud 153 spaces escapement lever 152 from platform 106. A spring 152B connects upturned lateral side 152A with the machine frame.

The present invention provides a universal bar 4 with a tongue 150 (see Figures 4, 12 and 18) having one end housed in a slot 151 located in upturned lateral side 152A. Referring to Figures 12, 13, 14, 15, 16, 17 and 18, an intermediate feed pawl lever 154, provided with an arcuate surface 155, a leg 156 and a bearing 157B, is pivotally mounted through stud 157 and bearing 157B to a permanent stop arm 158 at 157A. A washer 157C is interposed between the head of stud 157 and bearing 157B. A collar 149 surrounding stud 157, spaces intermediate feed pawl lever 154 from permanent stop arm 158. A link 160 pivotally connects escapement lever 152 at 152A with intermediate feed pawl lever 154 through rivet 154A. A feed pawl release lever 161 is provided with a finger 162, a leg 163, and arcuate surface 164 and is pivotally mounted at 165 to intermediate feed pawl lever 154 through rivet 165A and rivet hole 165B. Finger 162 slidingly engages arcuate surface 155. A feed pawl 166 provided with a tooth engaging finger 167 (which also abuts the permanent stop), a slit 168, an elongated slot 170 and a projection 171, is pivotally mounted by means of a stud 172 passing through said elongated slot 170. Stud 172 is secured in the end of shaft 173 upon which escapement wheel 175 is fixed (see Figure 26). Three washers are provided. Washer 146 is interposed between the head of stud 172 and feed pawl 166. Spacer washer 147 has a thickness greater than a feed pawl latch 177 and is placed between feed pawl 166 and a safety dog 181. Washer 148 is interposed between safety dog 181 and escapement wheel 175. A pinion 44A fixed to shaft 173 engages feed rack 44 (see Figures 3 and 26). A bushing 173A on shaft 173 is interposed between pinion 44A and platform 106 and is fixed to platform 106.

A spring 661 is provided and connected on one end to wing 183 and on the other end to latch 177 at 662. Another spring 665 is provided with one end engaging projection 184 at 663 and the other end engaging feed pawl 166 at 664. And still another spring 666 is secured on one end to leg 163 at 667 and on the other end to feed pawl lever 154 at 668. And still another spring 145 (which effects the circular motion of feed pawl 166) connects projection 187 with projection 184 at 670.

Arcuate surface 164 engages projection 171 to lift tooth engaging finger 167 out of engagement with the teeth 176 of escapement wheel 175. Elongated slot 170 permits this lifting movement. The latch 177 which is provided with a finger 178 (which strikes the selected stops) and with a projection 180, is pivotally mounted through 169 to safety dog 181 at 174. Safety dog 181 is provided with a fin 182, a wing 183, a projection 184 and is pivotally mounted by means of stud 172 to shaft 173 (Figure 26). Fin 182 is slidably mounted in slit 168. A catch 179 is pivotally mounted through stud 157 to permanent stop arm 158. Catch 179 lies between collar 149 and permanent stop arm 158. Catch 179 is provided with a projection 187 and two hook surfaces 188 and 189. Hook 189 engages finger 178 of latch 177 when in rest position. Hook 188 rests against finger 156 when in rest position as will appear in the operative description to follow. A group of selected stops generally indicated by reference character 185 are provided and are actuated in a manner later to be described.

When tongue 150 (Fig. 17) pivots escapement lever 152 around stud 153, link 160 pivots intermediate feed pawl 154 around stud 157 to cause feed pawl release lever 161 through arcuate surface 164 to engage projection 171 and thereby lift tooth engaging finger 167 of feed pawl 166 out of engagement with teeth 176. As feed pawl 166 is being lifted, projection 180 slides in behind notch 186 to latch finger 167 in feed pawl travel position. At the same time that intermediate feed pawl 154 is actuating feed pawl release lever 161, leg 156 on member 154 engages and pivots catch 179, around stud 157 so that catch 179 disengages finger 178, thereby allowing tooth engaging finger 167 of feed pawl 166 under the influence of spring 145 to travel in a concentric arc around the periphery of escapement wheel 175, until finger 178 engages one of the selected stops 185. When finger 178 strikes a stop 185, projection 180 is released from behind notch 186, thereby allowing tooth engaging finger 167 to engage a tooth 176. The instant tooth engaging finger 167 becomes disengaged from teeth 176 the carriage 49 is released to the influence of spring motor 45 for travel. Spring 145 rotates feed pawl 166 so rapidly that carriage 49 travels an ineffectual distance to prevent tooth engaging finger 167 from re-engaging a tooth 176. After finger 178 strikes a selected stop 185, carriage 49 under the influence of spring motor 45 rotates escapement wheel 175 and tooth engaging finger 167 until tooth engagement finger 167 strikes permanent stop 307 thereby arresting the travel of carriage 49. This is the letter feed movement of the carriage.

Figure 2:
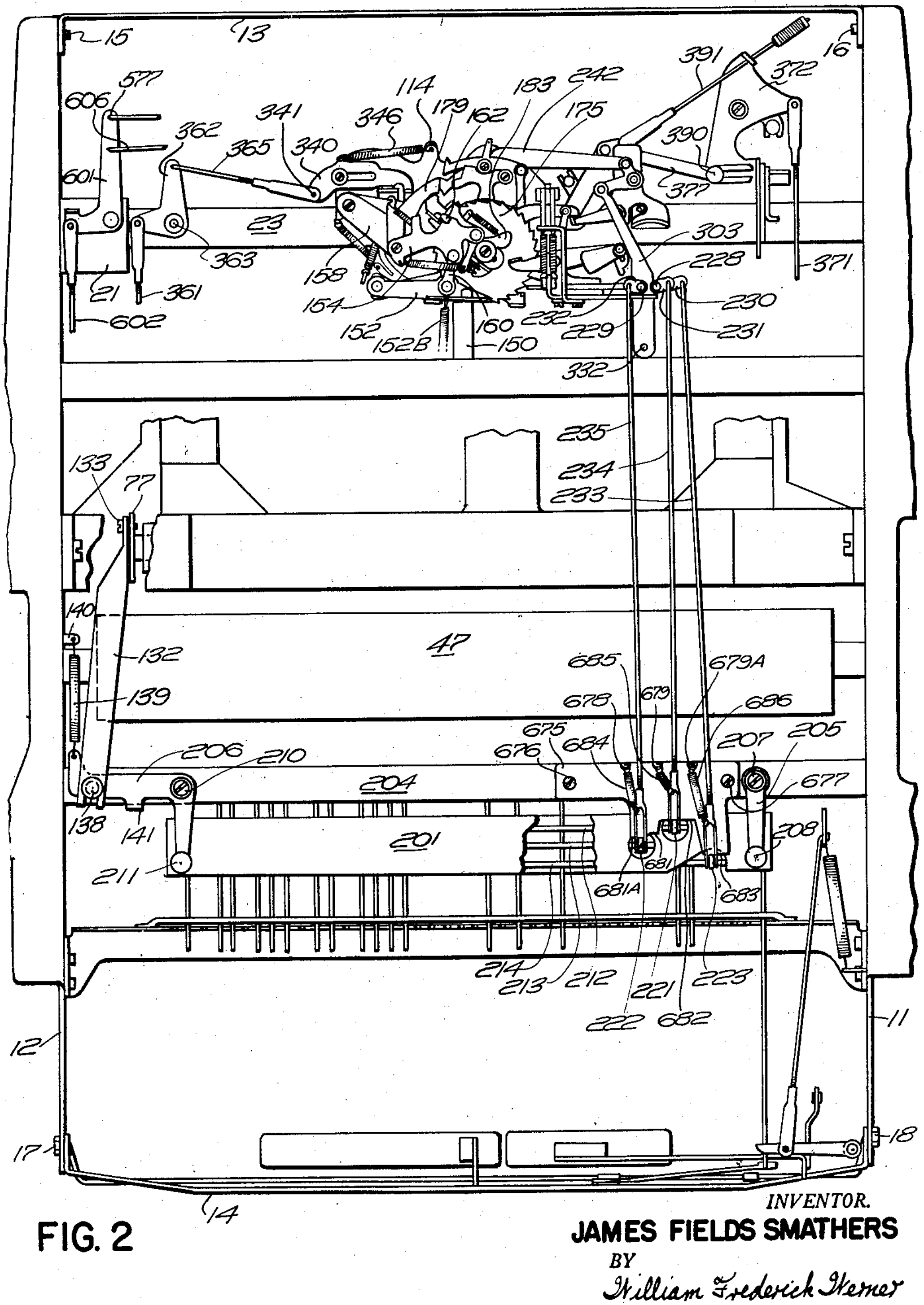
Figure 2 is a bottom plan view of Figure 1 showing the location of the proportional escapement mechanism and the connections from the keyboard controlling said proportional escapement mechanism.

A plate 201 (Figures 2, 7, 8 and 27) provided with upturned opposite sides 202 and 203 is pivotally connected to a cross bar 204 (which forms part of the typewriter machine frame and is secured to left side frame 11 and right side frame 12) by means of a straight lever 205 and a bell crank lever 206 (Figure 2). Straight lever 205 is pivotally connected at 207 to cross bar 204 and at 208 to plate 201. Bell crank lever 206 is pivotally mounted at 210 to cross bar 204 and at 211 to plate 201. Link 132 is pivotally connected at 138 to bell crank lever 206 (see Figure 2). A spring 139 connects bell crank lever 206 to an ear 140 in right side frame 12. Spring 139 holds bell crank lever 206, hence plate 201 in small character position. Shift toggle lever 39 (Figures 9 and 28), against the tension of spring 139, pivots bell crank lever 206, hence plate 201 into a second or large character position. A stop 141 provided on bell crank lever 206, abuts cross bar 204.

The segment 30 (Figures 1, 3, 4, 9 and 28) is normally in upper position to place the small type for engagement with the platen 40. The segment 30 is shifted to lower position for capital or upper case character contact with platen 40. Plate 201 (Figures 2, 4, 5, 6 and 7) is shifted to position projections 220 in the path of selectors 70 for capital or upper case characters. Stop 141 abuts cross bar 204 to limit the amount spring 139 can pivot bell crank lever 206 to place plate 201 in capital or upper case position.

A filler strip 215 (Figures 5, 6 and 7) is secured to side 203 by means of a screw 216. A bracket 119 is fixed to plate 201 by means of screws 259 and is provided with an ear 269 formed in one end. Templet rods 212, 213, 214 are pivotally mounted on one end in side 202. Templet rods 212 and 214 on the other end are pivotally mounted in filler strip 215. Templet rod 213 on its other end is pivotally mounted in ear 269.

These templet rods 212, 213 and 214 extend transversely of the typewriter and are disposed in intersecting planes with selectors 70 which engage the projections 220 in the stepped upper edge of said templet rods.

Three rocker arms 221, 222, 223 one fixed to each templet rod 212, 213, 214 are provided (Figures 2, 3, 4, 17, 18, 19 and 27). A bracket 125 having upturned opposite edges 126 and 127 is secured to base 107. Three extension rods 227, 228, 229 are rotatively mounted in upturned opposite edges 126 and 127. Three toes 230, 231, 232 are secured to one end of extension rods 227, 228, 229 respectively. Three clevis rods are provided. Clevis rod 233 connects rocker arm 223 with toe 230. Clevis rod 234 connects rocker arm 221 with toe 231. Clevis rod 235 connects rocker arm 222 with toe 232. Three fingers 236, 237, 238 are fixed to the other end of extension rods 227, 228, 229 respectively.

An expander bell crank lever 240 (Figures 17, 18 and 19) is pivotally mounted through stud 241 to platform 106. An expander arm 242 is pivotally connected at 243 to bell crank lever 240. An elongated slot 245 is provided in platform 106. A stud 246 is secured in expander arm 242 and is slidably mounted in elongated slot 245.

A group of selector stops generally indicated by reference character 185 consists of stop levers 250 and 251 pivotally mounted to expander arm 242 by means of stud 252. A third stop lever 253 of the group is pivotally mounted to expander arm 242 by means of stud 254. A fourth stop 255 of the group is formed in the end of expander arm 242. A link 256 provided with a fork 257 and an end 258 bent at right angles to provide a contact surface is pivotally connected at 260 to selector stop 251. Fork 257 slidably engages the shoulder of a stud 261 fixed in platform 106. A spring 262 is secured on one end to rivet 263 fixed in platform 106, and on the other end to link 256 at 264. Finger 237 engages end 258 to slide link 256 against the tension of spring 262 to pivot selector stop 251 around stud 252. A spring 266 is connected on one end to selector stop 251 at 267 and on the other end to expander 242 at 268. A spring 270 is connected to expander arm 242 at 271 and to a rivet 272 fixed to platform 106.

A second link 273 similar to link 256 is provided, having an elongated slot 257A instead of a fork 257 and provided with an end 274 bent at right angles to provide a contact surface for a lever 275 pivotally mounted to a stud 276 secured in the platform 106. Lever 275 has two projections 277 and 278. A spring 280 is secured at 281 to lever 275 and at 282 to a rivet fixed in platform 106. The lug 113 in platform 106 limits the pivotal movement of lever 275 under the influence of spring 280 by engaging surface 283 on lever 275. Projection 277 engages end 274.

Link 273 is pivotally connected to selector stop 250 in a manner similar to the connection of link 256 to selector stop 251 at 260. The elongated slot 257A in link 273 slidably engages the shoulder of stud 261. A spring 284 is secured on one end to rivet 263 and on the other end to link 273 at 285. Finger 236 engages end 274 to slide link 273 against the tension of spring 284 to pivot selector stop 250 around stud 252.

A lever 286 provided with a forked end 287 which pivotally engages the stud 153 fixed in platform 106 and has an elongated slot 290 which engages stud 276. A projection 291 is formed in one end of lever 286. An arm 292 is pivotally connected to lever 286 at 293 and to selector stop 253 at 294. Finger 238 engaging projection 291 pivots lever 286 around stud 153 and through arm 292 pivots selector stop 253 around stud 254 fixed in expander arm 242. A spring 296 is connected to lever 286 at 297 and to a rivet 298 fixed in platform 106.

A feature of the present invention is an expander key 300 added to the typewriter keyboard (Figures 1 and 4). This key 300 when actuated operates through expander arm 242 and gives additional space to the particular character being typed. The mechanism shown provides for the addition of only one space. It is understood however, that any number of spaces can be provided for with the present escapement. Through the use of the expander key intra word spacing regulation can be effected with a view to bringing typed lines out evenly or effecting justification.

Expander key 300 is pivotally mounted to a bracket 301 by means of a pin 302. Bracket 301 forms part of the machine frame. Expander key 300 is connected to rod 304 at 304A and to expander link 303 through rod 304 at 332 (see Figure 4). Expander link 303 is slidably mounted in a slot 305 located in bracket 125 and is pivotally connected at 306 to expander bell crank lever 240 (Figures 4, 10, 11, 17, 18 and 19).

It will be noted that expander key 300 through rod 304 and expander link 303 pivots expander bell crank lever 240 around stud 241 to slide expander arm 242 in slot 245 through stud 246 to change the relative position of studs 252 and 254 to thereby vary the position of selector stops 250, 251, 253 and stop 255 in the end of expander arm 242 (Figure 19).

Those characters which require a letter spacing other than the normal three units are associated with the selectors 70 provided with the hooks or projections 72 (Figs. 3 and 4). Each projection 72 is aligned with a projection 220 in the stepped upper edge of one of the templet rods 212, 213, or 214 (Figures 4, 5, 6, 7, 8 and 27).

When a type key 50 associated with a character, other than one requiring the normal three units of space in lower case or the normal four in upper case is manually depressed, moving cam 57 against power roller 47 as previously described (Figure 4), the projection 72 on its selector 70 will engage projection 220 and pivot one of the templet rods 212, 213 or 214, and thereby cause one of the rocker arms 221, 222 or 223 to pull one of the clevis rods 233, 234 or 235 and through one of the toes 230, 231 or 232 to rotate one of the extension rods 227, 228, 229 (Figures 17, 18 and 19), whereby one of the fingers 236, 237 or 238 will actuate one of the links 256, 273 or lever 286 to position one of the selector stops 255 (five unit), 250 (auxiliary three unit), 251 (two unit) or the shoulder 660 (four unit) of 253 into the path of finger 178 and thereby enable finger 178 to select the required number of teeth 176 in escapement wheel 175.

Figure 17:
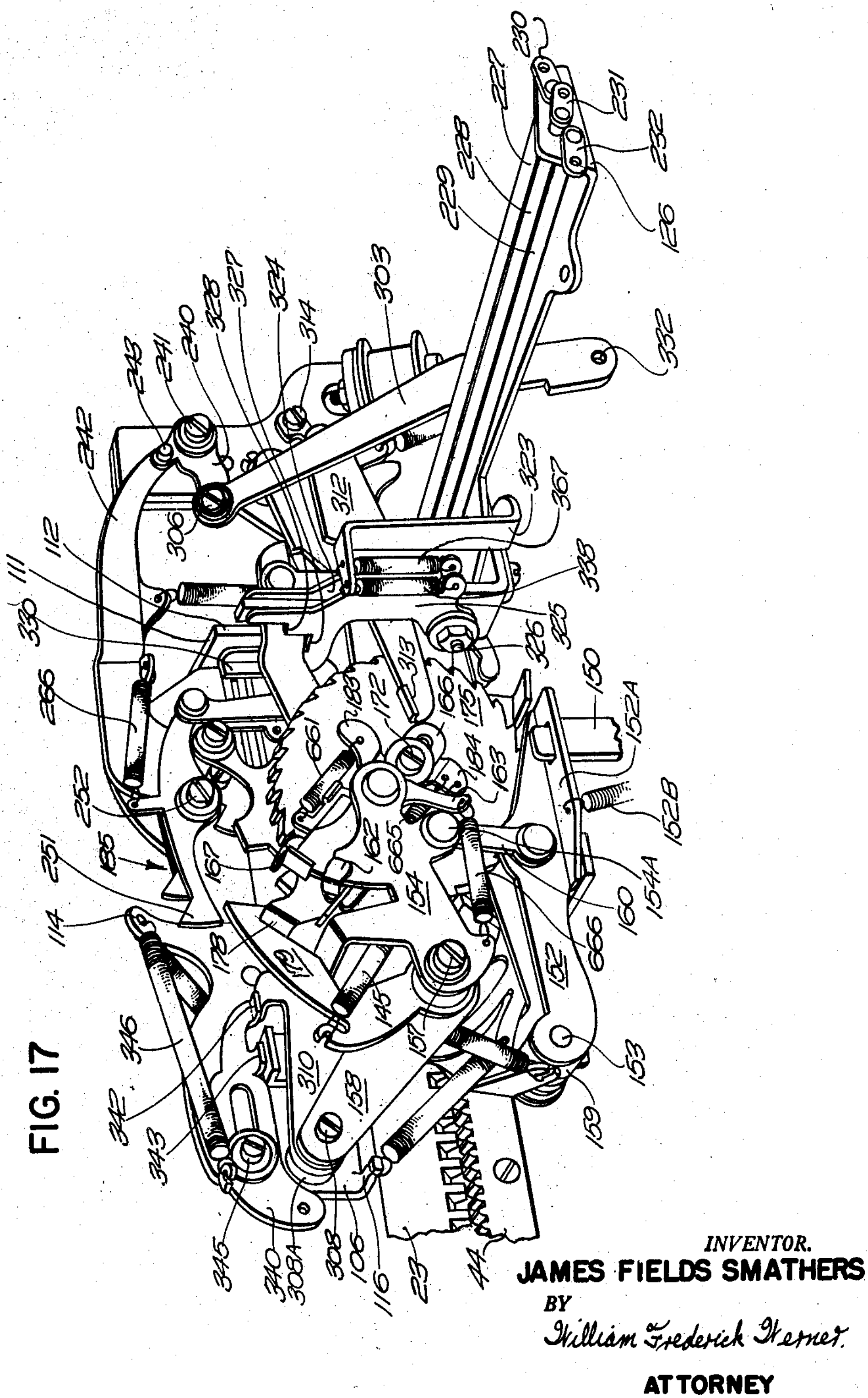
Figure 17 is a perspective view of the escapement mechanism and the controls associated with the escapement mechanism such as the stops, controls for operating the stops, the back spacer and the feed pawl disengaging lever.
Figure 18:
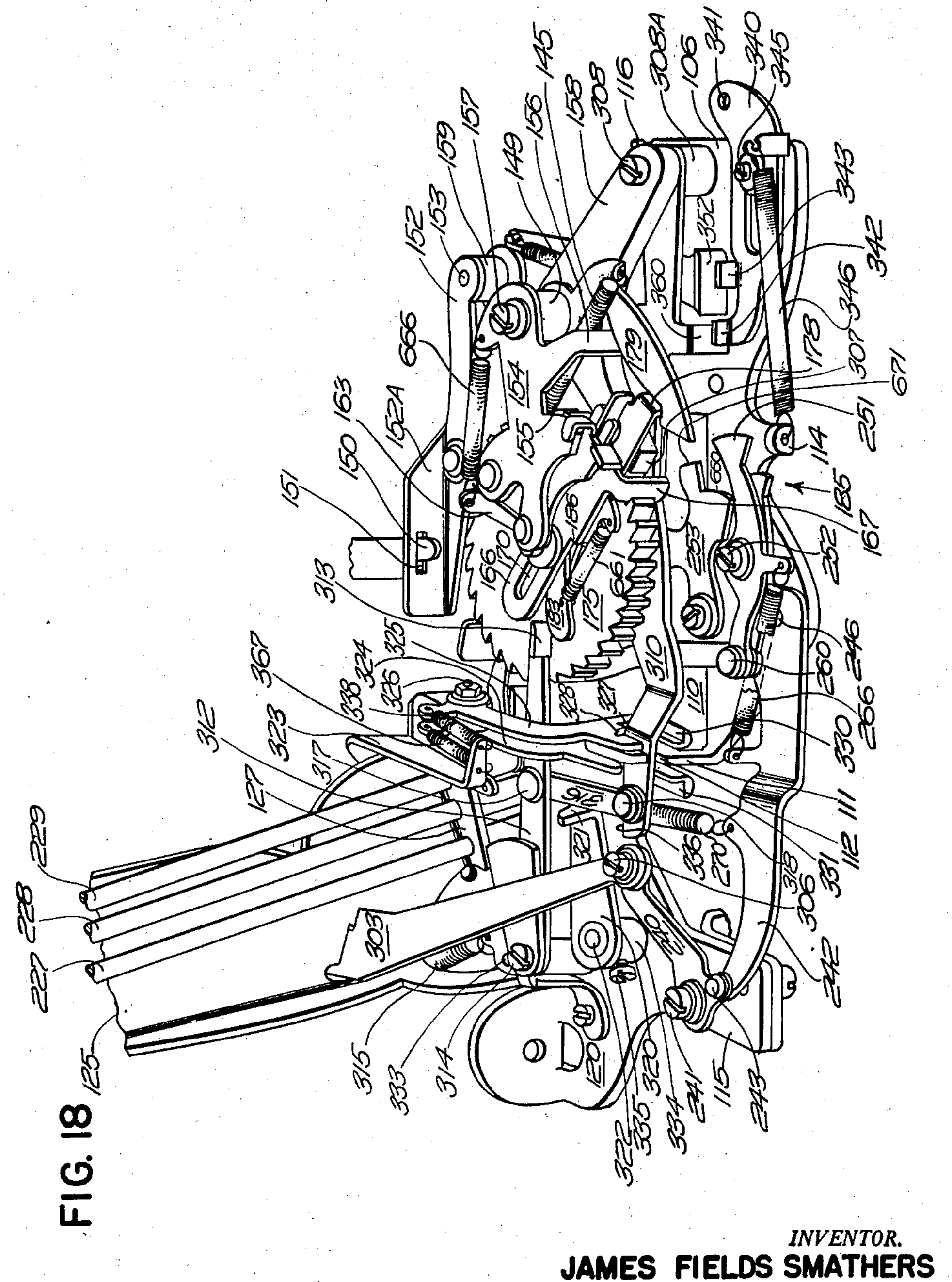
Figure 18 is a perspective view similar to Figure 17 taken from a different angle.

Permanent stop 158 in the form of a crooked lever is provided with stopping face 307 and is rigidly held in position by means of studs 308 and 157 fixed in platform 106 (Figures 17, 18 and 19). A collar 308A surrounding stud 308 spaces stop 158 from platform 106. Similarly a collar 157D surrounds stud 157 to space permanent stop 158 from platform 106. A feed pawl disengaging lever 310 (Figures 17, 18, 21, 22, 23 and 24) is pivotally mounted to stud 308 and is interposed between spacing collar 308A and permanent stop 158. It is provided with a leg 311. A lever 312 provided with an upturned end 313 is pivotally mounted through an elongated slot 333 to a stud 314 fixed in platform 106. A spring 315 is secured on one end to lever 312 and on the other end to platform 106. A link 316 is pivotally connected at 317 to lever 312 and at 318 to feed pawl disengaging lever 310. A lever 320 having one end bent into a projection 321 and the other end formed into a hub 334 is fixed on end to a shaft 322 by means of a set screw 335. Shaft 322 is pivotally mounted in back rail 23 with a lever 520 having a projection 521 fixed to the other end (see Figure 24). Shaft 322 is also rotatively mounted in a bearing located in an ear 335 formed in leg 105 (see Figures 10 and 32). Projection 321 engages feed pawl disengaging lever 310 at 336 to pivot feed pawl disengaging lever around stud 308 to cause link 316 to pivot lever 312 around stud 314 so that upturned end 313 strikes wing 183.

An arm 323 (Figures 17, 18) depending from base 107 pivotally mounts a carriage return safety dog 324 and a tabulator safety dog 325 by means of a stud 326. Tabulator safety dog 325 is provided with a recess 327 having a step 328 and an ear 330. Carriage return safety dog 324 is an exact duplicate in construction to tabulator safety dog 325, having an ear 331 corresponding to ear 330. Feed pawl disengaging lever 310 passes through slot 112 and recess 327 in tabulator safety dog 325 and the recess in carriage return safety dog 324 for purposes presently to appear. The feed pawl disengaging lever 310 is adapted to force the finger 167 out of engagement from the escapement wheel during tabulation and carriage return operation. Rotation of the feed pawl 165 and latch 177 however, is prevented by hook 189 of latch 179. This is to assure that, upon re-engagement of the finger 167 in the wheel after a tabulation or carriage return operation, no further carriage movement will occur.

*Back spacing*

The escapement mechanism incorporates (Figure 20) a back spacing feature. A sliding link 340 provided with a clevis rod connection at 341, two ears 342, 343 and an elongated slot 344 which slidingly engages a stud 345 fixed in platform 106. A spring 346 is connected to thumb 114 and to link 340 at 348. The feed pawl disengaging lever 310 is pivotally mounted on a stud 308 fixed in platform 106.

A back spacing lever 350 pivotally mounted to platform 106 through stud 157 is provided with a projection 352 formed in one end. A back spacer pawl 353 is pivotally mounted by means of rivet 354 to the other end of back spacing lever 350. Back spacer pawl 353 is shaped with three fingers 355, 356, 357. A spring 358 is connected to projection 116 and to finger 355. Finger 357 is shaped to engage and disengage teeth 176 in escapement wheel 175. Ear 342 engages a projection 360 formed in feed pawl disengaging lever 310. Ear 343 engages projection 352.

One of the plurality of cam yokes 57 is connected by means of a clevis rod 361 (see Figure 2) to a bell crank lever 362 pivotally mounted at 363 to back rail 23. A second clevis rod 365 pivotally connects bell crank lever 362 to back space dog 340 at 341.

When the back spacer key 338 (Figure 1) on the keyboard is depressed, a spring loaded cam 48 (Figures 2 and 4) engages power roller 47 to pull clevis rod 361 thereby pivoting bell crank lever 362 to rock downward and draw sideways sliding link 340 against the tension of spring 346 through clevis rod 365 (Figure 2). Ear 343 abuts projection 352. Through the rocking motion back spacer lever 350 pivots around stud 157 to cause back spacer pawl 353 through finger 357 to engage teeth 176 and advance the teeth 176 the increment of one tooth. The inclined back of the ratchet wheel teeth 176 permits the tooth 176 to raise tooth engaging finger 167 and drop into the next tooth. Spring 358 normally holds pawl 353 and finger 357 out of engagement with the ratchet wheel teeth 176. The movement of back space dog 340 governs the movement of pawl 353.

A safety feature is provided. Whenever the carriage is returning to line starting position or whenever the tabulator is set, feed pawl disengaging lever 310 is raised to lift tooth engaging finger 167 out of engagement with teeth 176, thereby causing projection 360 to engage and lift ear 342 (Fig. 20) so that ear 343 cannot engage projection 352 to pivot back space lever 350 and hence finger 357 into engagement with teeth 176.

*Tabulation*

And still another advantage of the present invention is the feature of an escapement mechanism adaptable to decimal tabulation. In the past only typewriters which did not have proportional escapements employed decimal tabulation. The present invention permits the decimal tabulation feature to be applied to the proportional escapement, power driven typewriter. However, the decimal tabulation feature is not shown in this application. Ordinary tabulation is depicted.

The tabulation control key 370 on the keyboard when depressed (Figure 1), releases a spring loaded cam 48, against the continuously revolving drive roll 47 (Figure 4). The yoke of the cam 57 is attached to one end of a clevis rod 371 (Figures 2, 21, 22, 23 and 24) which is pivotally mounted on its opposite end to a control lever 372. Control lever 372 is pivotally mounted through spacer 373 to bracket 374 secured to back rail 23. A blade lever 375 is pivotally mounted on a stud 376 fixed in plate 100. An intermediate link 377 is pivotally connected at 388 to blade lever 375 on one end, and through a forked opposite end 366, link 377 is pivotally connected to control lever 372 through pin 390. A clevis rod 391 is pivotally mounted at 392 to link 377 and is slidably mounted in ear 393 formed in control lever 372. A stop 394 is fixed to the end of clevis rod 391 while a movable stop 395 is slidably mounted thereon with a coil spring 396 interposed between said stops to provide a buffer which prevents pivotal point 388 from locking intermediate link 377 and lever 375 in a straight line position.

A flat lever 397 is pivotally mounted at 398 to bracket 374. A stud 400 is fixed to blade lever 375. An intermediate lever 401 is pivotally mounted to stud 400 and is provided with a forked end 402 which pivotally engages a pin 403 fixed in flat lever 397.

A shaft 404 is pivotally mounted in platform 106. A one arm lever 405 is fixed to one end of shaft 404. A two arm lever 406 is fixed to the other end of shaft 404. A clevis rod 407 pivotally connects one arm lever 405 with flat lever 397. The feed pawl disengaging lever 310 is pivotally mounted to stud 308 as previously described. A leg 311 on lever 310 engages a projection 410 on two arm lever 406. Feed pawl disengaging lever 310 is designed to lay behind escapement wheel 175 and below the periphery of the base of teeth 176. Feed pawl disengaging lever 310 raises teeth engaging finger 167 out of engagement with teeth 176 to free escapement wheel 175, hence the carriage is allowed to travel under the influence of the spring motor. A dog leg lever 411 is pivotally mounted to bracket 374 at 412. A link 413 is pivotally mounted at 414 to control lever 372. A forked end on link 413 (Figure 32) engages a spacer pivotally mounted to dog leg lever 411 at 415.

A tabulator bar 416, provided with a lug 417, a projection 418 and an elongated slot 420, is slidably mounted in bracket 421, through a pin 422 which is mounted between bracket 421 and leg 369 of a horse shoe bracket 370 described infra. A spring 423 is connected to bracket 374 at 424 and to tabulator bar 416 at 425.

A tabulator short latch 426 is pivotally mounted through stud 427 to back rail 23 so as to be yieldingly held against tabulator bar 416. A spring 427A wound around stud 427 is connected on one end to latch 426 and on the other end to stud 427. A stop 428 is fixed in back rail 23 to limit the movement of latch 426 in one direction. When tabulator bar 416 is pivoted sidewise, tabulator short latch 426 swings to hold tabulator bar 416 in the outward position. When lug 417 is struck by a tabulator stop, it causes tabulator bar 416 to yield through elongated slot 420 on pin 422 to position tabulator bar 416 in front of tabulator short latch 426.

Tabulator bar 416 is provided with a square slot 500 (Figure 29). A bracket 501 is secured to back rail 23. A bell crank lever 502 provided with a forked end 503 which straddles tabulator bar 416, is pivotally connected at 504 to bracket 501. A clevis rod connected to bell crank lever 502 at 505 is connected to brake mechanism for controlling the speed at which the spring motor pulls the carriage during tabulation.

A compound lever consisting of a leg 506 (Fig. 31) pivotally mounted to bracket 501 at 507 and a finger 508 pivotally connected to leg 506 at 509 engages slot 500 with end 510. A spring 501A connects finger 508 with bracket 501. An ear 511 on dog leg lever 411 abuts the back side of end 510 at 510A (Figures 21, 22, 24 and 31). Leg 506 is rocked clockwise about its pivot 507 simultaneously with the rocking of lever 372 by clevis rod 371 whereby tabulator lever 416 will be rotated counterclockwise about pin 422 thereby removing projection 418 out of the path of right margin stop during tabulation whereby the carriage may move beyond the margin stop and come to rest at a set stop beyond the set margin or at the end of its travel as is understood in the art.

A horse shoe bracket 370 (Figures 25, 29 and 30) has one leg fixed to back rail 23 by means of screw 371. An elongated slot 512 is provided in bracket 370. A stud 372 yieldingly holds the other leg of horse shoe bracket 370 to back rail 23 through elongated slot 512 (Fig. 29). The bracket 421 is fixed to horse shoe bracket 370 by means of rivet 514 and pin 515. When the end 417 of tabulator bar 416 is struck by a tabulator stop it causes tabulator bar 416 to move on pivot point 422 through elongated slot 420 and thereafter to cause pin 422, bracket 421, leg 369 of bracket 370 and spring 622 to yield and thereby enable tabulator bar 416 to drop in front of the leg of tabulator short latch 426. Reference character 369 indicates the top of one leg of horse shoe bracket 370. A spacer 368 surrounding rivet 514 spaces bracket 421 from horse shoe bracket leg 369.

A tabulator bell crank lever 550 is provided (Figures 21 and 22) having a contact end 551, and two upturned lateral sides 522 and 523. Lateral side 522 is provided with an ear 524. Lateral side 523 is formed into an extended leg 552. A rectangular block 525 is positioned between lateral sides 522 and 523. A pin 526 pivotally mounts lateral sides 522 and 523 to block 525 to give tabulator bell crank lever 550 pivotal movement toward and away from back rail 23. A stud 553 pivotally mounts block 525 to plate 100 by passing through a clearance hole 554, in tabulator bell crank lever 550. This pivotal movement grants tabulator bell crank lever 550 a sideways pivotal movement. A spring 570 is connected on one end to ear 524 and on the other end to ear 571 in plate 100. A link 555 provided with a projection 556 is pivotally mounted by means of stud 557 to plate 100. A tabulator latch 558 is pivotally mounted at 560 to ear 101, secured to plate 100. The tabulator latch 558 is also formed with a shoulder 675 upon which surface 640 of link 555 rests thereby normally maintaining link 555 against counterclockwise rotation under the action of a spring 621. The normal position of link 555 is such that it prevents tabulator safety dog 325 from latching the feed pawl disengaging lever 310 in the position to which it is moved to move finger 167 out of engagement with wheel 175. A stop pin 559 is fixed in plate 100. It limits the movement of tabulator bell crank lever 550 under the influence of spring 570.

Surface 640 of link 555 is also adapted to be engaged by end 641 of lever 642 which is pivotally mounted to plate 100 at 643 (Figures 21, 22, 23 and 30). A link 644 is pivotally connected at 645 to lever 642 and at 646 to lever 572. A spring 644A is connected to link 644 at 647 and to lever 642 at 648. A clearance hole 650 in plate 100 permits end 641 to project through plate 100 and while pivoted on one side of plate 100 end 641 actuates link 555 pivotally mounted on the opposite face of plate 100.

A latch 562 provided with a projection 563, a thumb 564 and an arm 565 is pivotally mounted through stud 566 to plate 100. A spring 567 is connected to arm 565 and to a pin 568 fixed in plate 100.

A safety mechanism is provided comprising a lever 572 having a forked area 573 and a reversibly bent arm 574 provided with an elongated slot 575. Lever 572 is pivotally mounted through screw 576 to plate 100. A clevis rod 577 (Figures 2 and 25) is pivotally and slidably connected to elongated slot 575 by means of pin 578. A link 580 having a projection 581 and a leg 582 slidingly engages plate 100 with surface 583 and is pivotally connected at 584 to lever 572. A spring 580A connects link 580 with the machine frame.

*Carriage return—Left hand margin control*

The typewriter embodying the present invention is provided with a carriage return key 600, a clutch operatively connected to a cam 48, a spring motor 45 and associated mechanism, which through a clevis rod 602 pivots a bell crank lever 601 pivotally mounted to right hand bracket 21 as is well known in the art (Figures 1, 2 and 3).

Equally well known in the art is the marginal control bar 41 provided with a marginal stop 603 having a stop guide 604.

Two clevis rods are provided. Clevis rod 577 as previously described connects lever 572 with bell crank lever 601. Clevis rod 606 connects bell crank lever 601 to blade lever 375 at 608.

Figure 23:
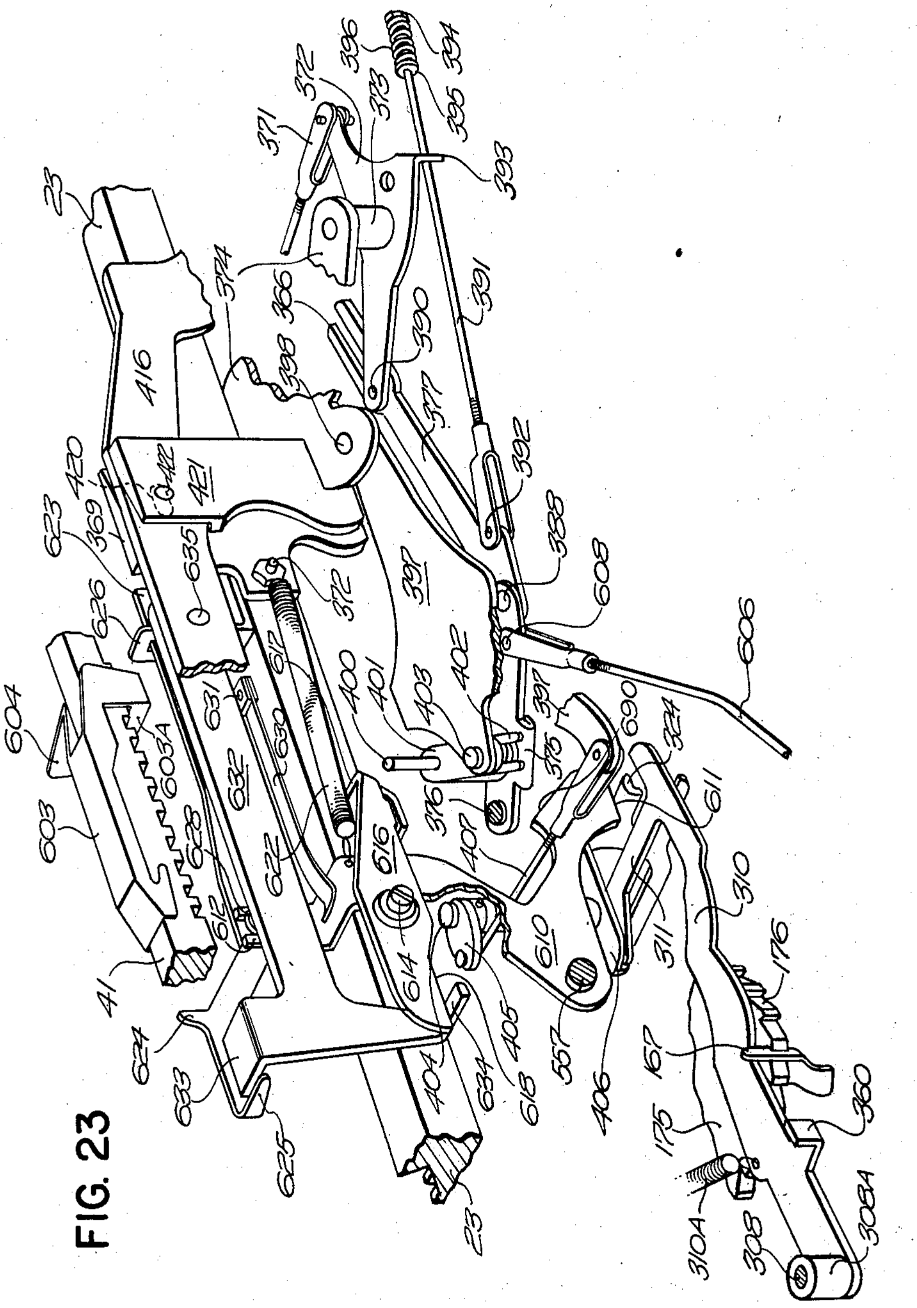
Figure 23 is a fragmentary perspective view of the margin control mechanism.
Figures 24, 31:
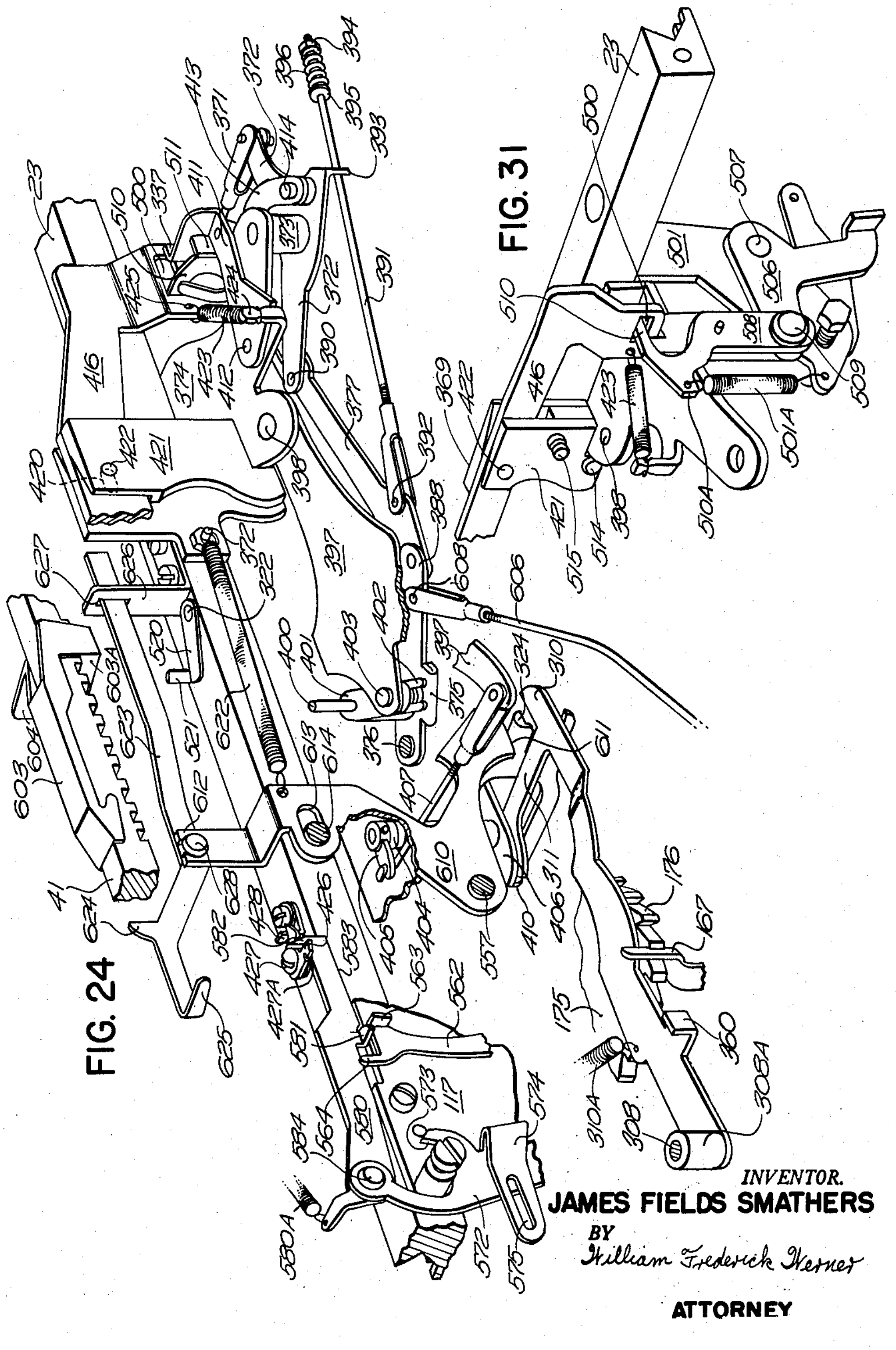
Figure 24 is a fragmentary perspective view of some of the mechanism not clearly seen in Figures 21, 22 and 23.
Figure 31 is a fragmentary perspective view similar to Figure 29 taken from another angle.

A carriage return lever 610 provided with a carriage return safety dog abutment 611 on one end and a fork 612 located in the opposite end. An elongated slot 613 is provided through which a stud 614 passes to pivotally hold lever 610 to plate 100. Stud 614 is secured in plate 100. Stud 557 upon which link 555 is pivoted also pivotally mounts carriage return lever 610 to plate 100. A spacing collar 615 on stud 557 spaces link 555 from lever 610 (Figures 21, 23 and 24).

A safety bumper lever 616 provided with a bent over portion 617 (Fig. 25) which overlies stud 400 whereby when lever 375 rocks about pivot 376 (Fig. 21) lever 616 will be cammed counterclockwise about its pivot 614. Lever 616 is also provided with a contact surface 618. A washer 620 on stud 614 is placed between lever 616 and lever 610.

A spring 621 is connected on one end to safety bumper lever 616 and on the other end to link 555. A spring 622 is connected on one end to carriage return lever 610 and on the other end to stud 372.

A carriage return link 623 is provided having a projection 624 and a hooked end 625. A bracket 626 provided with a slot 627 is fixed to back rail 23. Link 623 is slidably mounted in slot 627. A shoulder rivet 628 is fixed in carriage return link 623. Fork 612 engages the shoulder in rivet 628.

A leaf spring 630 is secured by means of rivets 631 to the underside of carriage return link 623 with one end of spring 630 yieldingly engaging carriage return lever 610.

A safety bumper link 632 provided with a projection 633 and a leg 634 is pivotally connected to tabulator bar 416 by means of a pin 635. Ear 636 on link 632 and ear 637 on tabulator bar 416 are provided to anchor a spring 638 (Figure 21). (An operative description follows the captions of Operation and Carriage Return and is entitled a Safety Feature.)

*Operation*

In operation an operator will strike a type key 50 which requires a spacing other than normal. For example, the lower case character "w" which requires four units of space, the equivalent of four teeth 176 on escapement wheel 175.

Striking type key 50 causes the type key to pivot on rod 51 and thereby tension spring 54 as the slot 53 in comb 52 guides the type key in its up and down movement. Spring 54 returns the type key to raised or normal position. Projection 38 engages sliding pawl 61 to force cam 57 against continuously rotating power shaft 47 whereby cam lever 55 is actuated and through connecting link 75 causes type bar 73 to pivot on rod 74 to print by striking platen 40.

The pivoting movement of type bar 73 causes the type bar to strike universal bar 4 which shifts toward the back of the typewriter, thereby causing tongue 150 to pivot escapement lever 152 around stud 153. Cam lever 55, simultaneously with the actuation of type bar 73, draws selector 70 toward the rear of the typewriter, thereby causing hook 72 to engage projections 220 (in Figures 4, 7 and 27). Small character "w" in Figure 27 indicates the exact projection 220, whereby rod 213 is rotated to swing rocker arm 222 toward the front of the typewriter carrying clevis rod 235 forwardly and through toe 232 to pivot extension rod 229 and thereby actuating finger 238 which engages projection 291 to pivot lever 286 around stud 153 and thereby through arm 292 to pivot third stop lever 253 around stud 254 to place four unit stop 660 in the path of travel of finger 178.

As the foregoing mechanism was actuated to place stop 660 in selected operating position, the pivoting movement of escapement lever 152 (Figs. 12–16), pivots intermediate feed pawl 154 around stud 157 through link 160.

The pivoting movement of the intermediate feed pawl 154 causes two actions to take place simultaneously.

One, leg 156 engages hook surface 188 to pivot catch 179 around stud 157, against the tension of spring 145, thereby removing hook 189 from engagement with finger 178 on member 177. Second, arcuate surface 164 on member 161 engaging projection 171 on the slidable pawl member, slides the feed pawl 166 on the stud 172 through elongated slot 170 against the tension of spring 665 to lift tooth engaging finger 167 out of engagement with teeth 176 on the escapement wheel 175. As feed pawl 166 is slid outwardly from stud 172, projection 180 slides behind notch 186 to latch slidable feed pawl 166 in position to travel in a circular motion on the periphery of escapement wheel 175, under the influence of spring 145, until finger 178 strikes stop 660. As finger 178 strikes stop 660 it is pivoted on rivet 169 against the tension of spring 661 to release projection 180 from behind notch 186 and thereby allow tooth engaging finger 167 to reengage a tooth 176 under the influence of spring 665. Escapement wheel 175 (as previously described) will carry tooth engaging finger 167 to permanent stop 307, thereby effecting letter spacing.

Selectors 70 are all moved the same distance by cam lever 55. The hooks 72, which engage the projections 220, rotate the rods 212, 213, 214 an equal amount. Therefore clevis rods 233, 234 and 235 are moved equal amounts. This is true for all characters except "W." Small case "w" takes four spaces. Capital "W" takes five spaces.

Projection 220 for the character "W" is provided with a normal projection 220 for the capital "W." Projection 220 is cut back as at 670 for small case "w." Therefore selector 70 travels an ineffectual distance which is the amount projection 220 for the capital "W" projects beyond the edge of projection 220 for small case "w." Therefore selector 70 pivots rod 213 a lesser amount for the small case "w" and therefore stop lever 253 is pivoted two different distances to present stop 660 or stop 255 to finger 178 for the selection of four or five spaces.

It will be noted that stop 671 is the normal position stop for the nineteen lower case letter characters, the cam levers 55 of which, are not provided with selectors 70. Rod 213 which controls third stop lever 253 (Fig. 18) has projections 220 (Figs. 7 and 27) for upper and lower case "W" and upper and lower case "M." Both M's take five spaces as does upper case "W." Therefore "M" projection 220 always presents stop 255 (Fig. 19) to finger 178 (Fig. 16) by pivoting third stop lever 253 out of the path of finger 178. Stop 255 is made operative by the link and lever removal of stop 253 which overrides it.

The projections 220 on rod 214 are not necessary for lower case characters and consequently become operative only when plate 201 is shifted to upper case position. When in upper case stop 253 presents stop surface 660 (four units) to finger 178; stop surface 671 (three units) thereof being ineffective if required. Hence rather than shift the machine back to lower case, the auxiliary stop 250 (three units) is employed. This stop is effectively presented to finger 178 when rod 214 pivots thereby actuating clevis rod 233, extension rod 227, finger 236 and lever 273.

The projections 220 on rod 212 control the stop lever 251 which controls finger 178 in selecting two spaces or two teeth 176. The train of mechanism is as follows: Type key 50 relating to the lower case character "f" has a selector 70 provided on its cam lever 55. Hook 72 will engage projection 220 "f" on rod 212 and rotate rod 212 thereby to swing rocker arm 221 to draw clevis rod 234 toward the front of the typewriter and through toe 231 to pivot extension rod 228 and thereby actuate finger 237 which engages end 258 on link 256 to slide link 256 through fork 257 on stud 261 against the tension of spring 262 to pivot stop lever 251 into the path of travel of finger 178. Stop lever 251 pivots on stud 252 against the tension of spring 266. Springs 266 and 262 return stop lever 251 and link 256 to normal position with stop lever 251 out of the path of finger 178.

In operation when it is desired to type a capital or upper case character, shift key 76 is struck. The depressing of shift key 76 and the train of mechanism it sets in motion has been previously described especially with reference to Figures 9 and 28. It was pointed out that this mechanism is well known in the art. The present invention added link 132 (Fig. 2) to shift toggle lever 39. The pivotal motion of shift toggle lever 39 pushes link 132 forwardly (see Figure 2) thereby pivoting bell crank lever 206 around stud 210 and against the tension of spring 139 to shift plate 201 so as to present either projections 220 or cut outs 680 to selector hooks 72 (Fig. 4). (See Figures 5, 6, 7 and 27.)

Assume type key 50 for capital letter "W" has been depressed. Plate 201 has shifted into capital letter position. Hook 72 will engage long projection 220 to rotate rod 213 a maximum amount, thereby pulling clevis rod 235 and the linkage it controls the maximum distance to pivot stop lever 253 out of the path of finger 178, so as to permit stop 255 to be engaged by finger 178.

A stop plate 675 is secured to cross bar 204 by means of screws 676, 677 (Figure 2). Stop plate 675 is provided with ears 678, 679, 679A and three stop surfaces 681A, 682, 683, against which swing and rest rocker arms 222, 221, 223, to provide a limiting movement for said rocker arms under the influence of springs 684, 685, 686 which connect rocker arm 222 and ear 678, rocker arm 221 and ear 679, rocker arm 223 and ear 679A, respectively. Figure 2 shows plate 201 in lower case position. When plate 201 is shifted to upper case position since stop surfaces 683 and 682 are parallel to the motion of 201, the positions of rocker arms 221 and 223 remain unchanged. Movement of plate 201 to upper case position (to the right as viewed in Fig. 2) however, causes rocker arm 222 to ride from 681A to 681 thereby enabling spring 684 to pull clevis rod 235 which positions stop 253 to present its stop surface 660 to finger 178.

The present mechanism is arranged to consider three spaces normal in lower case and four spaces normal in upper case. Normal spacing means that cam levers 55 are not provided with selectors 70 and if they are provided for one case they are made ineffectual to the chain of stop mechanism for the other case by passing through cut outs 680. Therefore hook 72 cannot engage a projection 220.

For example, the letter character "f" in small case requires two spaces which is one less than normal. Therefore cam lever 55 is provided with a selector 70, having a hook 72 which engages a projection 220 to place the stop 251 in position for finger 178 to select two teeth. In upper case the "F" requires four spaces which is normal. Therefore selector 70 passes through a slot 680 when actuated by cam lever 55. Therefore hook 72 does not engage a projection 220 and no stop mechanism is set.

In shifting from lower to upper case position, stop surface 681A is brought behind rocker arm 222, actuating rocker 222 in the same manner as if a projection 220 was engaged by a hook 72. Therefore, rocker arm 222 draws clevis rod 235 forward, actuating the train of mechanism which places stop 660 in position for engagement with finger 178.

In tabulating, a tabulating stop 43 is placed in desired position in the path of lug 417 and contact end 551. Tabulator key 370 is depressed causing a cam 48 to be actuated. Clevis rod 371 is secured on one end to the cam and on the other end to control lever 372, thereby pivoting control lever 372 on spacer 373. Control lever 372 pivots blade lever 375 around stud 376 through intermediate link 377. Blade lever 375 through intermediate lever 401 pivots flat lever 397 pivotally mounted at 398 which through clevis rod 407 pivots one arm lever 405 on shaft 404 and thereby swings two arm lever 406 abutting leg 311 of feed pawl disengaging lever 310 whereby tooth engaging finger 167 is raised out of engagement with escapement wheel teeth 176 as feed pawl disengaging lever 310 pivots around stud 308.

Simultaneously with the action just described, the pivoting of control lever 372 causes link 413 through pivot 414 to move toward the rear of the machine and through the spacer connected at 415 to lever 411, to pivot dog leg lever 411 around pivot 412 so that end 337 on lever 411 pushes tabulating bar 416 to cause it to pivot sideways on stud 422 whereby lug 417 is moved toward the rear of the machine into the path of tabulator stop 43. Tabulator short latch 426 under the influence of its spring 427A pivots behind tabulator bar 416 to hold it in tabulator stop position. Tongue 366 fixed to tabulator bar 416 pivots tabulator bell crank lever 550 around pin 526 to place contact end 551 in the path of tabulating stop 43. The sideways pivoting movement of tabulator bar 416 causes bar 416 to pivot tabulator latch 558 around pivotal point 560 whereby the stop 675 on latch 558 disengages link 555 permitting it to pivot under urging of spring 621 on stud 557 away from tabulator safety dog 325 to allow the tabulator safety dog to be influenced by its spring 338 whereby the stop 328 thereof passes under the feed pawl disengaging lever 310 thereby to latch it in position so as to maintain finger 167 disengaged from wheel 175. The escapement wheel will then be free to allow the carriage 49 to travel under the influence of spring motor 45.

When tabulator bell crank lever 550 pivots forwardly, latch 562 under the influence of spring 567 pivots on stud 566 to place projection 563 behind lever 550 to hold it in outward position.

Figures 22, 30:
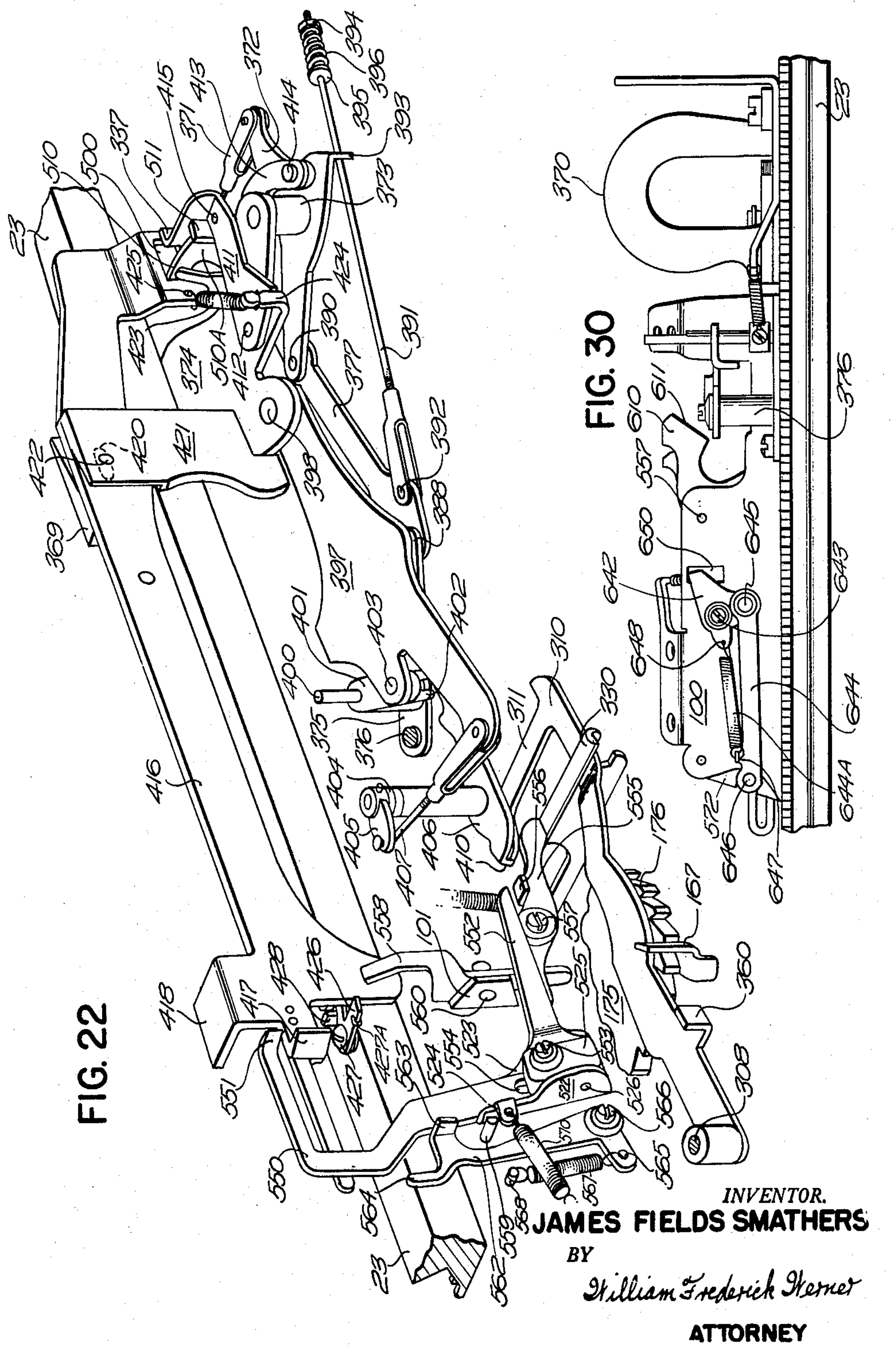
Figure 22 is a perspective view of the mechanism used for controlling tabulation.
Figure 30 is a bottom plan view of the right hand end of Figure 25.

The carriage 49 under the influence of the spring motor 45 carries a set tabulator stop 43 to the right as viewed in Fig. 21. The set tabulator stop 43 simultaneously strikes lug 417 and contact end 551. The impact moves the tabulator bar 416 until pin 422 engages the left end of elongated slot 420. Continued movement of the tabulator bar thereafter tensions leg 369 of horseshoe bracket 370 thereby absorbing the impact of the carriage and momentarily limiting its movement. As the tabulator bar 416 approaches the limit of its movement it slips off tabulator short latch 426 and at the limit of its movement swings out of the path of the tabulator stop 43. While the tabulator bar is approaching its limit, contact end 51 which also was engaged by stop 43 pivots lever 550 around stud 553 thereby causing leg extension 552 to push projection 556 downwardly around stud 557. Projection 556 forces tabulator safety dog 325 downwardly freeing feed pawl disengaging lever 310 which pivots on stud 308 to allow tooth engaging finger 167 to drop into engagement with a tooth 176 under the influence of spring 665. The carriage which was momentarily stopped at the limit of motion of tabulator bar 416, now resumes its travel unimpeded by lug 417, over a very short distance which when translated into movement of the escapement is a distance less than the pitch of the teeth on the escapement wheel. Movement of the carriage through this short distance pivots lever 550 further whereby it slips off latch projection 563 and under the influence of springs 570 resumes its normal position as shown in Figs. 21 and 22. This time the carriage movement is arrested by engagement of finger 167 in a tooth 176 of the escapement wheel. As is apparent even margins are obtained in that the impact of the carriage is absorbed by a yieldable member (369) which after absorbing the impact is ineffective to cause carriage rebound. The momentum of the carriage remaining after the lug 417 is removed from the path of the tab stop on the carriage being insufficient to cause rebound such as will cause finger 167 to slide past a tooth in the escapement wheel.

*Carriage return*

When the carriage 49 is to be returned under the influence of power, the operator will depress carriage return key 600 (Fig. 1), thereby actuating a cam 48 which simultaneously performs two functions. One, the cam causes the clutch to engage the carriage 49 with the electric motor. Two, through a clevis rod 606, the cam 48 pivots blade lever 375 around stud 376 which through pivotal connection 388 draws intermediate link 377 through its fork 366 on pin 390 away from control lever 372. Control lever 372 remains inoperative.

Pivoting blade lever 375 pivots stud 400 under projection 617 thereby pivoting safety bumper lever 616 on stud 614, causing leg 634 on safety bumper link 632 to pivot projection 633 out of the path of travel of base 603A on marginal stop 603.

Pivoting blade lever 375 through intermediate lever 401 pivots flat lever 397 which through clevis rod 407 pivots one arm lever 405, thereby pivoting two arm lever 406 abutting leg 311 whereby feed pawl disengaging lever 310 lifts tooth engaging finger 167 out of engagement with teeth 176. The carriage 49 is now free to travel under the influence of the clutch which connects the carriage to the main drive motor.

The carriage travels until stop guide 604 strikes projection 624 to pull carriage return link 623 sideways, thereby pivoting carriage return link 610 around stud 557 against the tension of spring 622. Carriage return safety dog abutment 611 is raised away from carriage return safety dog 324 which under the influence of spring 367 pivots on stud 326 to move the step under feed pawl disengaging lever 310 to lock feed pawl disengaging lever 310 in position to hold tooth engaging finger 167 out of engagement with teeth 176.

The pivoting of carriage return link 610 through surface 690 engages to pivot blade lever 375 on stud 376 and through clevis rod 606 and bell crank lever 601, clevis rod 602 disengages the clutch to terminate the power return movement of the carriage 49.

The pivoting of blade lever 375 through surface 690 removes stud 400 from beneath projection 617 so that safety bumper lever 616 is free to allow spring 638 to pivot safety bumper link 632 on pin 635 to place projection 633 in position between base 603A and projection 418 as carriage 49 banks (rebounds).

The pivoting of blade lever 375 through surface 690 also pivots (in a return direction) flat lever 397 which through clevis rod 407 pivots one arm lever 405 and two arm lever 406. Two arm lever 406 is removed from engagement with leg extension 311.

While the events described above are occurring base 603A strikes projection 418 and banks (rebounds). During rebound the carriage is freed to the action of the spring motor 45 to move the carriage in a letter spacing direction which is opposite to the carriage return direction. The movement of the carriage 49 in a letter spacing direction causes stop guide 604 to disengage projection 624 and allow spring 622 to pivot carriage return link 610 whereby abutment 611 strikes carriage return safety dog 324. The step in carriage return safety dog 324 is removed to permit feed pawl disengaging lever 310, under the influence of spring 310A, to fall into the slot in the return safety dog 324. This action takes feed pawl disengaging lever 310 away from engagement with tooth engaging finger 167 whereby spring 665 causes tooth engaging finger 167 to engage a tooth 176. Tooth engaging finger 167 will rest against permanent stop 307 to hold carriage 49 in arrested position. Inasmuch as the tooth 167 engages the escapement wheel 175 before the carriage gains any appreciable momentum in a letter feed direction no appreciable rebounding of the teeth 176 of the escapement wheel against the finger 167 occurs such as to cause the finger to ratchet over a tooth.

*A safety feature*

In cases where an operator returns the carriage manually, a function improper to the operation of a power driven typewriter, a safety device is provided to insure the proper setting of the left hand margin.

As the operative manually returns the carriage, the base 603A of margin stop 603 strikes projection 633 on safety bumper link 632 which arrests movement of the carriage and properly aligns the left hand margin because projection 633 is equivalent in width to the bounce or banking done by the carriage when returned by power as previously described.

*A second safety feature*

In the event an operator inadvertently strikes the tabulator key 370 at the end of carriage travel in a letter feed direction or during return travel of the carriage, lug 417 and projection 551 will be placed in the path of the tabulator stops. This is undesirable because if the tabulation lever 416 is set during a tabulation operation there would be clashing of the set tab stops and the lug 417 and contact end 551. This safety feature therefore prevents setting the tabulator levers during carriage return. If therefore the tabulator levers have been inadvertently set when the operator strikes the carriage return key it is noted that clevis rod 577 is connected to the same connection as clevis rod 606. The carriage return cam will pull clevis rod 577 pivoting lever 572 around stud 576. Lever 572 will pull link 580 provided with projection 581 and leg 582. Projection 581 engages thumb 564 to pull latch 562 out from behind tabulator bell crank lever 550 to restore it to normal position. Leg 582 pivots tabulator short latch 426 from behind tabulator bar 416 to restore it to normal position. It is to be noted that by striking both the tabulator and carriage return key, the tabulator and carriage return safety dogs 323 and 324 respectively are both activated to hold the feed pawl disengaging lever 310 in position wherein tooth engaging finger 167 is disengaged. Link 644 connected at 646 to lever 572 therefore pivots lever 642 which strikes link 555 at 640 pivoting link 555 through projection 556 to engage the tabulator safety dog 325 to cause the safety dog 325 to remain in disengaged position with feed pawl disengaging lever 310 so that said lever would be free to engage tooth engaging finger 167. The carriage return safety dog 324 is then free to function in a normal manner.

Having shown and described a preferred embodiment of the present invention, by way of example, it should be realized that structural changes can be made and other examples given without departing from either the spirit or scope of this invention.

What I claim is:

1. A proportional spacing mechanism for business machines consisting of a shaft, an escapement wheel having teeth, being fixed to said shaft, a safety dog having a fin and being rotatably mounted on said shaft, a latch provided with a projection, pivotally connected to said safety dog, resilient means connecting said latch to said safety dog, a feed pawl having an elongated slot, a tooth engaging finger, a slit and a notch, resilient means connecting said feed pawl to said safety dog, said fin engaging said slit, said feed pawl through said elongated slot being pivotally connected to said shaft, said notch engaging and disengaging said projection and means to engage and disengage said finger with said teeth whereby said notch engages said projection when said finger is in disengaged position with said teeth to lock said finger out of engagement with said teeth.

2. A proportional spacing mechanism for business machines consisting of a shaft, an escapement member having teeth, being operatively connected to said shaft, a safety dog pivotally connected to said shaft, a latch pivotally connected to said safety dog, resilient means connecting said latch and said safety dog, a feed pawl having a finger pivotally connected to said shaft and having a first means to allow radial movement on said shaft, resilient means connecting said feed pawl and said safety dog, a second means to engage said finger with said teeth, a third means to disengage said finger from said teeth and a fourth means to cause said latch to engage said feed pawl to lock said finger in position out of engagement with said teeth until said second means unlocks said latch to allow said finger to engage said teeth.

3. A proportional spacing mechanism consisting of an escapement wheel, a safety dog rotatably mounted adjacent said escapement wheel, a latch pivotally connected to said safety dog, resilient means connecting said latch to said safety dog, a combination stop and feed pawl having a first means to rotate concentrically around said escapement wheel, a second means to move radially to said escapement wheel and a third means to engage and disengage said escapement wheel, resilient means connecting said feed pawl to said safety dog, a fourth means actuating said third means and a fifth means to lock said safety dog and latch in one position on said escapement wheel under the control of said fourth means.

4. A proportional spacing mechanism consisting of a shaft, an escapement wheel having teeth, being fixed to said shaft, a safety dog having a fin, a wing, a first projection and being rotatably connected to said shaft, a latch provided with a second projection, a first finger and pivotally connected to said safety dog, resilient means connecting said latch to said wing, a combination stop and feed pawl having an elongated slot, a tooth engaging finger, a slit, a notch, a third projection and being pivotally connected through said elongated slot to said shaft with said slit engaging said fin, said tooth engaging finger engaging one of the teeth on said escapement wheel, said notch engaging and disengaging said second projection and resilient means connecting said feed pawl to said safety dog, a first mounting, a second mounting, a catch provided with a first hook surface and a second hook surface, being pivotally mounted on said first mounting, an intermediate feed pawl lever provided with a leg and an arcuate surface being pivotally mounted to said first mounting, resilient means connecting said catch with said first projection, a feed pawl release lever having a second arcuate surface, a second finger, and a second leg, said pawl release lever being pivotally connected to said intermediate feed pawl lever, resilient means connecting said second leg with said intermediate feed pawl lever, said second finger embracing said first arcuate surface, an escapement lever pivotally mounted on said second mounting, and a link pivotally connecting said escapement lever with said intermediate feed pawl lever, said third projection engaging said second arcuate surface, said first hook surface engaging said leg, said second hook surface engaging said first finger, actuation of said escapement lever through said link pivoting said intermediate feed pawl, to cause said second arcuate surface to engage said third projection to radially move said feed pawl on said elongated slot to lift said tooth engaging finger out of engagement with said teeth, said notch engaging said second projection, while said leg, through said first hook surface, pivots said catch to release said second hook surface from engagement with said first finger whereby said safety dog, said latch and said feed pawl, pivot on said shaft under the influence of said resilient means connecting said first projection with said catch.

5. In a proportional spacing typewriter having type bars, key levers, and means controlled by said key levers for operating said type bars, a proportional escapement mechanism consisting of a toothed escapement wheel, a single combination stop and feed pawl mounted on the wheel for circular rotation with said escapement wheel, means for engaging said feed pawl with said toothed escapement wheel, a second means for disengaging said feed pawl from said toothed escapement wheel, a group of selector stops for limiting the rotation of said feed pawl around said escapement wheel, a selector mechanism actuated by said type bar operating means for controlling the positioning of the selector stops into the path of circular rotation of said feed pawl in accordance with the widths of the lower case characters, a shift mechanism, means controlled by the shift mechanism for controlling the selector mechanism to modify the control exercised by the selector mechanism over the selector stops according to the widths of the upper case characters, the selector stops actuating the means for engaging the combination stop and feed pawl with the toothed escapement wheel and a third means operable by the several type bars for actuating said second means for disengaging said feed pawl from said toothed escapement wheel to free said feed pawl for circular rotation around said escapement wheel.

6. In a proportional spacing typewriter having a plurality of type bars each bearing a type character of varying width, key levers and means controlled by said key levers for operating said type bars, a proportional escapement mechanism consisting of an escapement wheel provided with teeth, a feed pawl mounted for circular rotation around said escapement wheel, a first means for engaging said feed pawl with said teeth, a second means for disengaging said feed pawl from engagement with said teeth, a third means for locking said feed pawl in disengaged position, a group of selector stops corresponding to the varying width of the type characters, selector mechanism actuated by said type bar operating means for selecting and positioning the selector stops in the path of circular rotation of said feed pawl, the selector stops actuating said first means for engaging said feed pawl with said teeth, and a fourth means operable by said plurality of type bars for actuating said second means to disengage said feed pawl from engagement with said teeth, said second means actuating said third means whereby said feed pawl is locked in disengaged position until said feed pawl is acted upon by said first means to engage said feed pawl with said teeth.

7. In a proportional spacing typewriter having a plurality of type bars, key levers, and means controlled by said key levers for operating said type bars, a proportional escapement mechanism consisting of an escapement wheel provided with teeth, a feed pawl mounted for circular rotation around said escapement wheel, said feed pawl engaging and disengaging said teeth, a first means for locking said feed pawl in disengaged position, a plurality of selectors, means to actuate said selectors under control of their respective type bar operating means, a plurality of selector stops under control of said selectors, said selector stops engaging to unlock said first means to cause said feed pawl to engage said teeth, and a second means actuated by said type bars for disengaging said feed pawl from said teeth and for actuating said first means to lock said feed pawl in disengaged position.

8. In a proportional spacing typewriter, the combination of type keys and type bars, power means controlled by said type keys and operatively connected to said type bars to drive said type bars, a carriage, an escapement wheel having teeth, a drive connection between said escapement wheel and said carriage, a feed pawl mounted for circular rotation around said escapement wheel, engageable and disengageable with said teeth, a first means to lock said feed pawl in disengaged position, a series of selectors operatively connected to said power means, a plurality of stops in the path of circular movement of said feed pawl, means uniting said selectors with their respective stops, a second means under control of said type bars for disengaging said feed pawl from said teeth, a third means to cause circular rotation of said feed pawl around said escapement wheel when in disengaged tooth position, said stops when struck by said feed pawl causing said feed pawl to engage said teeth as said first means is actuated by said stops to unlock said feed pawl from disengaged position, and a fourth means to cause said carriage to travel in letter spacing movement, said letter spacing movement being determined by the circular movement of said feed pawl in locked position from disengaged to engaged position with said teeth on said escapement wheel.

9. In a proportional spacing typewriter, the combination of type keys, type bars, power means operatively connected to said type keys to drive said type bars, a carriage, a first means to drive said carriage in a letter spacing direction, an escapement wheel having teeth, a drive connection between said escapement wheel and said carriage, a combination stop and feed pawl having a projection mounted for concentric rotation around said escapement wheel, said feed pawl engaging and disengaging said teeth, a safety dog pivotally mounted to said escapement wheel, a latch having a first finger pivotally connected to said safety dog, guide means between said safety dog and feed pawl, a spring between said feed pawl and safety dog, a locking means between said latch and feed pawl, a first mounting, a catch having a first hook and a second hook pivotally connected to said first mounting, a spring connecting said catch and said safety dog, an intermediate feed pawl lever having a leg and an arcuate surface pivotally connected to said first mounting, said first hook engaging and disengaging said leg, said second hook engaging and disengaging said finger, said arcuate surface engaging said projection on said feed pawl, movement of said intermediate feed pawl through said arcuate surface contacting said projection disengaging said feed pawl from said teeth as said leg pivots said catch to release said second hook from said finger to release said feed pawl to concentric rotation under the influence of said spring between the catch and safety dog, a series of selectors operatively connected to said power means and under control of the respective type key, a plurality of stops in the path of concentric rotation of said feed pawl, a first means uniting said selectors with their respective stops, and a second means under control of said type bars for actuating said intermediate feed pawl lever, said feed pawl upon striking a stop unlocking said locking means to cause said feed pawl to engage said teeth and thereby permit said carriage under said first means to drive the distance said escapement wheel rotates from feed pawl disengagement with said escapement wheel teeth to feed pawl engagement with the teeth on said escapement wheel.

10. A proportional spacing mechanism for a typewriter consisting of a platform, a shaft rotatably mounted in said platform, an escapement wheel having teeth being fixed to said shaft, a safety dog having a fin being rotatably connected to said shaft, a latch provided with a first finger pivotally connected to said safety dog, a spring connecting said latch and said safety dog, a feed pawl having an elongated slot, a tooth engaging finger, a third projection and a slit, a first means between said latch and said feed pawl to hold said tooth engaging finger out of engagement with said teeth on said escapement wheel, a spring connecting said feed pawl and said safety dog, said fin engaging said slit, said feed pawl through said elongated slot being pivotally connected to said shaft, a first mounting and a second mounting fixed to said platform, a catch provided with a first hook surface and a second hook surface pivotally mounted on said first mounting, an intermediate feed pawl lever provided with a leg, an arcuate surface and pivotally mounted to said first mounting, a spring connecting said catch with said safety dog, a feed pawl release lever having a second arcuate surface, a second finger, a second leg and being pivotally connected to said intermediate feed pawl lever, a spring connecting said second leg and said intermediate feed pawl lever, said second finger slidably embracing said first arcuate surface, an escapement lever pivotally mounted on said second mounting, a link pivotally connecting said escapement lever and said intermediate feed pawl lever, said third projection engaging said second arcuate surface to radially move said feed pawl along said elongated slot, said first hook surface engaging said leg, said second hook surface engaging said first finger, an expander arm pivotally connected to said platform, a plurality of stops pivotally mounted on said expander arm, a second means to pivot said expander arm to shift said plurality of stops, and a third means controlling the relative position of one stop to the remainder of said plurality of stops, actuation of said escapement lever through said link pivoting said intermediate feed pawl to cause said second arcuate surface to engage said third projection to radially move said feed pawl to lift said tooth engaging finger out of engagement with said teeth, whereby said first means locks said tooth engaging finger out of engagement with said teeth while said leg through said first hook surface pivots said catch to release said second hook surface from engagement with said first finger, whereby said safety dog, said latch and said feed pawl pivot on said shaft under the influence of said last mentioned spring to cause said tooth engaging finger to contact one of said plurality of stops whereby said first means is actuated to unlock and allow said tooth engaging finger to engage a tooth on said escapement wheel.

11. In a machine of the class described, the combination of a carriage, typing means comprising a series of type bars, a continually operating power roller common to all type bars, cam units each connected to a type bar and adapted to be selectively engaged with the power roller to operate the type bar, keys for selectively engaging the cam units with the power roller, a series of selectors each associated with a key and having a connection to the corresponding cam unit whereby the selectors are operated each time the corresponding cam unit is operated, a plurality of templet rods each provided with a series of projections selectively actuated by said selectors, an escapement wheel, means interconnecting said escapement wheel and said carriage including a shaft to which said escapement wheel is fixed, a safety dog provided with a fin rotatably mounted to said shaft, a latch provided with a finger pivotally connected to said safety dog, a spring connecting said latch and safety dog, a combination stop and feed pawl having an elongated slot, a tooth engaging finger and a slit, a spring connecting said feed pawl and safety dog, said fin engaging said slit, said feed pawl through said elongated slot being pivotally connected to said shaft, a first means between said latch and feed pawl to lock said feed pawl in one position and have said latch and feed pawl unlocked in another position, a first mounting, an intermediate feed pawl lever having a leg and an arcuate surface pivotally connected to said first mounting, said arcuate surface engaging said safety dog, a catch having a first hook and a second hook pivotally connected to said first mounting, a spring connecting said catch and safety dog, said first hook engaging said leg, said second hook engaging said finger, a permanent stop, a plurality of selective stops, means selectively connecting said templet rods with the corresponding stops, and means actuated by said type bars to pivot said intermediate feed pawl lever, which through said arcuate surface actuating said feed pawl, disengages said feed pawl from engagement with said teeth to permit said escapement wheel and carriage to move a distance equal to the concentric rotation of said feed pawl from engagement with a stop whereby said feed pawl engages the teeth on said escapement wheel until said feed pawl engages said permanent stop.

12. A proportional spacing mechanism for typewriters consisting of a platform, a shaft rotatably mounted in said platform, an escapement wheel having teeth secured to said shaft, a safety dog rotatably mounted on said shaft, a latch provided with a finger pivotally connected to said safety dog, a spring connecting said latch to said safety dog, a combination stop and feed pawl having an elongated slot, and tooth engaging finger, a spring connecting said feed pawl to said safety dog, said combination stop and feed pawl through said elongated slot being pivotally mounted on said shaft for rotation around said escapement wheel and for radial movement on said shaft, means between said safety dog and feed pawl to guide said feed pawl in said radial movement, means between said latch and said feed pawl to lock said feed pawl in position for said concentric rotation, said tooth engaging finger engaging and disengaging said teeth, a catch having a first hook surface and a second hook surface pivotally mounted to said platform, an intermediate feed pawl lever having a leg and an arcuate surface pivotally mounted to said platform, said leg engaging and disengaging said first hook surface, said finger on said latch engaging and disengaging said second hook surface, a spring connecting said catch to said safety dog to rotate said safety dog, latch and combination stop and feed pawl on said shaft, said arcuate surface engaging said projection on said feed pawl to provide said radial movement to disengage said tooth engaging finger from said teeth, means to pivot said intermediate feed pawl to actuate said arcuate surface and to pivot said catch through said leg to remove said second hook surface from contact with said projection to permit said combination stop and feed pawl to concentrically rotate under the influence of said spring between said safety dog and catch, a permanent stop fixed to said platform to limit concentric rotation of said tooth engaging finger in one direction, a plurality of selector stops, means for selectively actuating said selector stops, means to selectively position one of said selector stops in the path of concentric rotation of the finger on said latch to limit concentric rotation of said tooth engaging finger in a second direction, and means for adjustably positioning said means to selectively position said selector stops in the path of concentric rotation of said finger, engagement of said finger with a selector stop operating said means between said latch and said feed pawl to unlock said feed pawl to allow said tooth engaging finger to engage a tooth on said escapement wheel.

13. A claim as defined in claim 12 having the additional construction feature of a feed pawl disengaging lever pivotally connected to said platform, and means to pivot said lever to disengage said tooth engaging finger from engagement with said teeth on said escapement wheel.

14. A proportional spacing mechanism for typewriters consisting of a platform, a shaft rotatably mounted on said platform, an escapement wheel having teeth, secured to said shaft, a safety dog having a fin, rotatably mounted on said shaft, a latch provided with a finger and a projection, pivotally connected to said safety dog, a spring connecting said latch and said safety dog, a combination stop and feed pawl having an elongated slot, a tooth engaging finger, a projection, a notch and a slit, a spring connecting said feed pawl to said safety dog, said combination stop and feed pawl through said elongated slot being pivotally mounted on said shaft for concentric rotation around said escapement wheel and for radial movement on said shaft, said fin engaging said slit to guide said safety pawl in said radial movement, said projection and said notch engaging to lock said feed pawl in disengaged tooth position for concentric rotation, a spring connecting said feed pawl and safety dog, said tooth engaging finger engaging and disengaging said teeth, a catch having a first hook and a second hook, pivotally mounted to said platform, an intermediate feed pawl lever having an arcuate surface, pivotally mounted to said platform, said leg engaging said first hook to pivot said catch, said finger on said latch engaging and disengaging said second hook, a spring connecting said catch to said safety dog to rotate said safety dog, latch and combination stop and feed pawl on said shaft, a feed pawl release lever having a leg, and an arcuate surface, pivotally connected to said intermediate feed pawl lever, a spring connecting said leg to said intermediate feed pawl lever, said leg abutting said intermediate feed pawl lever to limit the pivotal movement of said feed pawl release lever in one direction, said feed pawl release lever's arcuate surface egaging said projection on said feed pawl to provide radial movement to disengage said tooth engaging finger from said teeth, means to pivot said intermediate feed pawl to actuate said feed pawl release lever arcuate surface to pivot said catch through said leg, to remove said second hook surface from contact with said projection to permit said combination stop and feed pawl to concentrically rotate under the influence of said spring between said safety dog and catch, a permanent stop fixed to said platform to limit concentric rotation of said tooth engaging finger in one direction, an expander arm pivotally connected to said platform, a plurality of selector stops pivotally connected to said expander arm, means to selectively position one of said selector stops in the path of concentric rotation of the finger on said latch to limit concentric rotation of with said tooth engaging finger in a second direction, and means to pivot said expander arm to adjustably position said selector stops in the path of concentric rotation of said finger, engagement of said finger with a selector stop operating said means between said latch and said feed pawl to unlock said combination stop and feed pawl to allow said tooth engaging finger to engage a tooth on said escapement wheel.

15. In a proportional spacing typewriter, type keys and type bars, power means operatively connected to said type keys to drive said type bars, a plurality of selector stops, each for effecting a different value of escapement for said type bars, a series of selectors, each selectively connected to a type bar under control of a type key, each selector having a projection, a series of templet rods cooperating with the selectors whereby a templet rod is operated by a selector projection when the corresponding key is operated, connections between the templet rods and selector stops whereby each templet rod controls one of the selector stops, shift mechanism, and means connected to the shift mechanism for displacing the templet rods relative to the selector projections to change the effect of the selector projections on the templet rods upon a shift operation.

16. A mechanism as defined in claim 15 being further characterized in that means is provided for adjustably positioning said selector stops for effecting a different value of escapement for all the type bars independent of said shift mechanism.

17. In a proportional spacing typewriter, a carriage, type keys, type bars, power means controlled by said type keys and operatively connected to said type bars to drive said type bars, selectively operable carriage feed mechanism for feeding the carriage variable extents according to the widths of the characters typed including a single escapement wheel having teeth and a single pawl directly mounted on the wheel for stopping and feeding the escapement wheel to effect feeding the carriage variable extents, and selecting means controlled by said power means for selectively engaging said single pawl, said selecting means being selectively settable to effect four different degrees of feed of the carriage through said single pawl, each degree of feed being variable according to the widths of characters typed.

18. A mechanism defined as in claim 17 being further characterized in that: a manual control device for selecting a fifth degree of spacing is provided, said fifth degree of space being common to all of the characters typed.

19. In a proportional spacing typewriter, a carriage, type keys, type bars, power means operatively connected to said type keys to drive said type bars, a selectively operable carriage feed mechanism for feeding the carriage variable extents according to the widths of the characters typed including an escapement wheel having teeth, a single pawl, means to cause said single pawl to engage and disengage said teeth to effect feeding the carriage variable extents, means to lock said pawl in disengaged tooth position and to unlock said pawl to engage said teeth, and selecting means controlled by said type keys for selectively engaging said single pawl to effect the unlocking of said pawl from locked position, said selecting means being selectively settable to effect varying degrees of feed of the carriage through said single pawl, each degree of feed being variable according to the widths of characters typed.

20. In a proportional spacing typewriter, a carriage, means tending to advance the carriage, type keys, type bars, power means operatively connected to said type keys to drive said type bars, said type keys and type bars having type of various widths, mechanism for releasing the carriage after printing a letter and thereafter stopping the carriage after it has travelled a distance corresponding to the width of the letter printed, said mechanism including a carriage operated escapement wheel having teeth, fixed to a shaft, a safety dog having a fin rotatably connected to said shaft, a latch provided with a projection and a finger, pivotally connected to said safety dog, a spring connecting said latch and safety dog, and a combination stop and feed pawl having an elongated slot, a tooth engaging finger, a slit, a notch, a third projection said pawl being pivotally connected through said elongated slot to said shaft, with said slit engaging said fin, said tooth engaging finger engaging one of the teeth on said escapement wheel, said notch engaging and disengaging said projection and a spring connecting said combination stop and feed pawl to said safety dog, an intermediate feed pawl lever provided with an arcuate surface, mounted for pivotal movement so that said arcuate surface engages said third projection to raise said tooth engaging finger out of engagement with said teeth to cause said projection to engage said notch to lock said combination stop and feed pawl in tooth disengaging position for concentric travel around said ratchet wheel, means to effect said travel, and selector stop means for both limiting the concentric travel of said combination stop and feed pawl in accordance with the width of type upon movement of said arcuate surface and for causing the projection and notch to disengage to effect engagement of the tooth engaging finger with a tooth, the carriage being under the influence of said means tending to advance said carriage during the concentric travel of said combination stop and feed pawl.

21. A back spacing mechanism for a typewriter consisting of a plate, a platform secured to said plate, a back rail, said plate being fixed to said back rail, an escapement wheel having teeth pivotally mounted to said platform, a combination stop and feed pawl means engageable with said teeth, a sliding link having an ear and an elongated slot, a first stud slidingly mounting said sliding link through said elongated slot to said platform, a first spring connecting said sliding link to said platform, a back spacing lever provided with a projection pivotally connected by means of a second stud to said platform, said projection underlying said ear, a back spacer pawl having a finger being pivotally connected to said back spacing lever, a spring connecting said back spacer pawl to said platform, said finger engaging and disengaging said teeth, and means to draw said sliding link against the tension of said first mentioned spring causing said ear to engage said projection to pivot said back spacing lever, thereby causing said finger to engage said teeth and rotate said escapement wheel in a backward direction in relation to said combination stop and feed pawl engaging said teeth.

22. A proportional spacing mechanism consisting of an escapement member, a combination stop and feed pawl engageable and disengageable with said escapement member, a first means to disengage said stop and feed pawl from engagement with said escapement member, a second means to lock said stop and feed pawl in disengaged position and a third means to actuate said second means to unlock said stop and feed pawl and cause engagement of said stop and feed pawl with said escapement member.

23. A proportional spacing mechanism consisting of an escapement member, a combination stop and feed pawl engageable and disengageable with said escapement member, a first means to disengage said stop and feed pawl from engagement with said escapement member, a second means to lock said stop and feed pawl in disengaged position, a plurality of selector stops, and a third means for positioning one of said plurality of selector stops in the path of travel of said escapement member, said one of said plurality of selector stops engaging said second means to unlock said stop and feed pawl and cause engagement of said stop and feed pawl with said escapement member.

24. In a proportional spacing typewriter, a plurality of type bars each bearing a type character of varying width, a proportional escapement mechanism consisting of an escapement member, a feed pawl mounted for engagement with said escapement member, a first means for engaging said feed pawl with said escapement member, a second means for disengaging said feed pawl from engagement with said escapement member, a third means for locking said feed pawl in disengaged position, a group of selector stops corresponding to the varying widths of the type characters, type bar controlled selector mechanism for selecting and positioning the selector stops in the path of engagement with said feed pawl, the selector stops actuating said first means for engaging said feed pawl with said escapement member, and a fourth means actuated by said plurality of type bars for actuating said second means to disengage said feed pawl from engagement with said escapement member, said second means actauting said third means whereby said feed pawl is locked in disengaged position until said feed pawl is acted upon by said first means to engage said feed pawl with said escapement member.

25. In a proportional spacing typewriter, a carriage, type keys, type bars, means controlled by said type keys and operatively connected to said type bars to drive said type bars, selectively operable carriage feed mechanism for feeding the carriage variable extents according to the widths of the characters typed including an escapement member having teeth, a single pawl pivotally mounted directly on said escapement member for stopping and feeding the escapement member to effect feeding the carriage variable extents, selecting means controlled by said type bar driving means for selectively engaging said single pawl, said selecting means being selectively settable to effect a plurality of units of spacing for said carriage through said single pawl, each unit of spacing of said plurality of units of spacing being variable according to the widths of characters typed.

26. A mechanism defined as in claim 25 being further characterized in that: means is provided in the form of a control device for adding an additional unit of space to each unit of space in said plurality of units of space.

27. In a proportional spacing typewriter, a carriage, an escapement member, a first means connecting said escapement member with said carriage, a second means to move said carriage and said escapement member in one direction, a plurality of selector stops connected to a common support lever, selecting means for positioning one of said plurality of selector stops in operative position, a single combination stop and feed pawl carried directly on and engageable and disengageable with said escapement member, a third means to disengage said stop and feed pawl from engagement with said escapement member, a fourth means for effecting relative movement between said stop and feed pawl in relation to said escapement member, the extent of said relative movement being determined by engagement of said feed pawl with said selector stop in operative position to determine the variable extent of the carriage movement, and a fifth means operatively connected to said common support lever to vary the operative position of said selector stop.

28. In a proportional spacing typewriter, an escapement member provided with teeth, a combination stop and feed pawl engageable with said teeth, a platform, a sliding link provided with an ear, pivotally and slidably mounted to said platform, resilient means connecting said sliding link to said platform, a back spacing lever provided with a projection pivotally mounted to said platform, a back spacer pawl provided with a finger pivotally mounted to said back spacing lever, said finger engageable with said teeth, resilient means connecting said back spacer pawl to said platform, and means to slide and pivot said sliding link against the tension of the first mentioned resilient means, whereby said ear engages said projection to pivot said back spacing lever and thereby cause said finger, against the tension of said second mentioned resilient means, to advance said teeth in a backward direction in relation to said combination stop and feed pawl engaging said teeth.

29. In a typewriter having a set of type of varying widths, a motor driven carriage having a rack and adapted to execute tabulating runs, a plurality of stop elements on said carriage, a first means to select and place a stop element in operative position, a tabulator bar projectable into tabulation range with said stop element and being displaceable by said stop element during a tabulating run of said carriage; an escapement wheel having teeth, a rotatable shaft having a pinion meshing with said rack, said escapement wheel fixed to said shaft, a single combined stop and feed pawl pivotally mounted directly on said escapement wheel, a second means normally engaging said pawl with said teeth to hold said carriage in arrested position, a third means to disengage said pawl with said teeth and thereafter lock said pawl in its disengaged position, a fourth means to actuate said third means for unlocking and re-engaging said pawl with said teeth, a feed pawl disengaging lever, and a fifth means actuated by the displacement of said tabulator bar to actuate said feed pawl disengaging lever to disengage said combination stop and feed pawl from engagement with said teeth to free said carriage to the force of said motor drive.

30. A claim as defined in claim 29 being further characterized by: a sixth means to lock said feed pawl disengaging lever in position to hold said combination stop and feed pawl in disengaged position with said teeth, a tabulator bell crank lever, resilient means to hold said tabulator bell crank lever in rest position, said stop element moving said tabulator bell crank lever into active position, and a seventh means actuated by said movement to unlock said third means and to restore said feed pawl disengaging lever to rest position whereby said combination stop and feed pawl engages said teeth and thereby arrests movement of said carriage through said second means.

31. In a typewriter, a carriage, a spring motor urging said carriage in one direction, a rack fixed to said carriage, a rotatable shaft having a pinion meshing with said rack, an escapement wheel having teeth fixed for rotation with said shaft, a single pawl pivotably mounted directly on said escapement wheel and combining stop and feed control of said escapement wheel through engagement and disengagement with said teeth, a permanent stop, said single pawl normally engaging said teeth and holding said carriage at rest against the urging of said spring motor by engaging said permanent stop, a first means to disengage said pawl from engagement with said teeth to free said carriage to the influence of said spring motor, and a second stop, and a second means to cause said pawl to travel in a direction opposite to the direction of rotation of said escapement wheel until it strikes said second stop whereby said pawl engages said teeth and is carried by said teeth to said permanent stop.

32. In a typewriter having a set of type of varying width, a carriage, a first means urging said carriage in letter spacing direction, an escapement member, a single pawl pivotally mounted directly on said escapement member, a first stop, a second means connecting said escapement member to said carriage, said single pawl normally engaging said escapement member and said first stop to hold said carriage at rest against the urging of said first means, a third means to disengage said single pawl from engagement with said escapement member to free said carriage to the influence of said first means, a plurality of selector stops, a fourth means to actuate one of said plurality of selector stops in accordance with the varying width of one of said set of type into letter spacing position, and a fifth means to cause engagement of said single pawl with the selected stop in letter spacing position whereby said single pawl re-engages said escapement member and travels to said first stop to again hold said carriage against the urging of said first means.

33. In a typewriter having a set of type of varying width, a carriage, a spring motor urging said carriage in one direction, a rack fixed to said carriage, and a rotatable shaft having a pinion meshing with said rack, that improvement in a proportional escapement mechanism consisting of an escapement wheel provided with teeth and fixed for rotation with said shaft, a single pawl pivotally mounted directly on said escapement wheel, a first stop, said single pawl normally engaging said teeth and said first stop to hold said carriage at rest against the urging of said spring motor, a first means to disengage said single pawl from engagement with said teeth to free said carriage to the influence of said spring motor, a plurality of selected stops, a second means to actuate one of said plurality of selected stops in accordance with the varying width of one of said set of type, in to letter spacing position, and a third means to cause said single pawl to travel in a direction opposite to the direction of rotation of said escapement wheel until it strikes the selected stop in letter spacing position whereby said single pawl re-engages said teeth and is carried by said teeth to said first stop.

34. A claim as defined in claim 33 being further characterized in that: a fourth means is provided to lock said single pawl in teeth disengaged position during the cycle of travel in a direction opposite to the direction of rotation of said escapement wheel, the engagement of said single pawl with said selected stop actuating said fourth means to unlock said single pawl to permit re-engagement of said single pawl with said teeth.

35. In a typewriter having a carriage adapted to execute tabulating runs on a frame, the combination with a stop element on said carriage, of a tabulator bar provided with lateral and transverse movement on said frame, an escapement wheel having teeth adapted to rotate during tabulating runs of said carriage, a combination stop and feed pawl normally engaging said teeth to hold said carriage in arrested position, a feed pawl disengaging lever, a tabulator safety dog, a tabulator key, a first means actuated by said tabulator key to laterally move said tabulator bar, a tabulator short latch actuated by the lateral movement of said tabulator bar to hold said tabulator bar in projected lateral position, said first means also actuating said feed pawl disengaging lever into locked position in said tabulator safety dog whereby said combination stop and feed pawl is disengaged from said teeth to free said escapement wheel and carriage to a tabulation run, a tabulator bell crank lever, a latch, lateral movement of said tabulator bar causing said latch to hold said tabulator bell crank lever in projected position for engagement with said stop element, and a stop element during a tabulation run engaging said tabulator bar to move said tabulator bar transversely whereby said tabulator bar, spring actuated, moves laterally away from said tabulator latch and out of projected position for engagement with said stop element to allow said stop element to engage said tabulator bell crank lever to cause said tabulator bell crank lever to be disengaged from said latch and to unlock said tabulator safety dog from said feed pawl disengaging lever whereby said combination stop and feed pawl engages said teeth to arrest the tabulation run of said carriage through said escapement wheel.

36. In a typewriter, a carriage, a motor drive adapted to move the carriage in letter space direction, power means to move said carriage in return direction, a carriage return key, a rack on said carriage, an escapement wheel having teeth, a rotatable shaft having a pinion in mesh with said rack, said escapement wheel being fixed to said shaft, a combination stop and feed pawl normally engaging said teeth to hold said carriage in arrested position, a feed pawl disengaging lever, a carriage return safety dog, a first means actuated by said carriage return key, actuating said feed pawl disengaging lever into locked position in said carriage return safety dog whereby said combination stop and feed pawl is disengaged from said teeth to free said escapement wheel and carriage to the power means to move said carriage in a return direction, a carriage return link, a lever, a stop element on said carriage engageable with said carriage return link during the carriage return movement, whereby said lever engages said carriage return safety dog to unlock said feed pawl disengaging lever to allow said combination stop and feed pawl to re-engage said teeth to arrest movement of said carriage through said escapement wheel.

37. In a typewriter, a tabulator key, a carriage return key, a tabulator bar provided with lateral and transverse movement, a tabulator short latch, said tabulator key actuating said tabulator bar in lateral direction to cause said tabulator short latch to lock said tabulator bar in lateral position, a tabulator bell crank lever having lateral and transverse movement, a latch, said tabulator key through said tabulator bar causing said latch to lock said tabulator bell crank lever in lateral position, a lever, and a link connecting said lever to said tabulator short latch and said latch, said carriage return key actuating said lever to hold said tabulator short latch and said latch from behind said tabulator bar and said tabulator bell crank lever respectively, to prevent locking said tabulator bar and said tabulator bell crank lever in locked lateral position.

38. In a typewriter, a tabulator key, a carriage return key, a tabulator bar provided with lateral and transverse movement, said tabulator key actuating said tabulator bar into lateral position, a first means to lock said tabulator bar in lateral position, a tabulator bell crank lever having lateral and transverse movement, said tabulator key actuating said tabulator bell crank lever into lateral position, a second means to lock said tabulator bell crank lever in transverse position, and a third means connected to said first means and said second means and under control of said carriage return key to hold said first and second means in unlocked tabulator bar lateral position and unlocked tabulator bell crank lever lateral position.

39. In a typewriter, individual type bars, a set of type of varying width, for said type bars, type bar operating means, a carriage, a spring motor urging said carriage in one direction, a rack fixed to said carriage, and a rotatable shaft having a pinion meshing with said rack, an escapement wheel provided with teeth and fixed for rotation with said shaft, a single pawl, a fixed stop, said single pawl normally engaging said teeth and said fixed stop to hold said carriage at rest against the urging of said spring motor, a first means actuated by the individual type bar to disengage said single pawl from engagement with said teeth to free said carriage to the influence of said spring motor, a plurality of selector stops, a second means including said type bar operating means to select and actuate one of said plurality of selector stops in accordance with the varying width of one of said set of type into letter spacing position, and resilient means to cause said single pawl to travel in a direction opposite to the direction of rotation of said escapement wheel until it strikes the selected stop in letter spacing position whereby said single pawl re-engages said teeth and is carried by said teeth to said first stop.

40. In a typewriter, individual type keys, individual type bars, power means connecting said individual type key to the corresponding individual type bar, said type bars bearing type of varying width, a carriage, a motor urging said carriage in one direction, a rack fixed to said carriage, a rotatable shaft having a pinion meshing with said rack, an escapement wheel provided with teeth and fixed for rotation with said shaft, a single pawl, a fixed stop, said single pawl normally engaging said teeth and said fixed stop to hold said carriage at rest against the urging of said motor, a first means actuated by the individual type bar to disengage said single pawl from engagement with said teeth to free said carriage to the influence of said motor, latch means to lock said single pawl in teeth disengaging position, a plurality of selector stops, a second means including said individual type bar to select and, through said power means, actuate one of said plurality of selector stops, in accordance with the varying width of said individual type, into letter spacing position, and resilient means to cause said single pawl to travel in locked position concentric to the periphery of said escapement wheel in a direction opposite to the direction of rotation of said escapement wheel, until it strikes the selected stop in letter spacing position whereby said single pawl is unlocked to allow said single pawl to re-engage said teeth and be carried by said teeth until said single pawl re-engages said fixed stop, the distance said teeth carry said pawl being the proportional distance said carriage travels in letter spacing the individual type of varying width.

41. In a typewriter, a carriage, a motor drive adapted to move the carriage in letter space direction, power means to move said carriage in return direction, a carriage return key, an escapement wheel having teeth, means connecting said escapement wheel to said carriage, said escapement wheel being rotated by the movement of said carriage, a single pawl centrally pivoted directly on said escapement wheel normally engaging said teeth to hold said carriage in arrested position, a first means engaging said single pawl, a second means under control of said carriage return key for actuating said first means to cause disengagement of said single pawl with said teeth to free said escapement wheel and carriage to the power means to move said carriage in a return direction, and a third means engageable with said carriage during the carriage return movement actuating said first means whereby said single pawl re-engages said teeth to arrest movement of said carriage through said escapement wheel and said power means is disengaged from said carriage.

42. In an electrically powered typewriter having a carriage adapted to execute tabulating runs on a frame, the combination with a stop element on said carriage, of a tabulator bar provided with lateral and transverse movement on said frame, an escapement wheel having teeth, adapted to rotate during tabulating runs of said carriage, a single pawl centrally pivoted directly on said escapement wheel normally engaging said teeth to hold said carriage in arrested position, a tabulator key, a first means actuated by said tabulator key to laterally move said tabulator bar, a latch to lock said tabulator bar in laterally projected position, a second means comprising a lever, also being actuated by said first means to disengage said single pawl from engagement with said teeth to free said escapement wheel and carriage to a tabulation run, and a stop element on said carriage during a tabulation run engaging said tabulator bar to move said tabulator bar transversely to unlock said latch and move said tabulator bar laterally out of projected position, the release of said tabulator key actuating said first means whereby said second means comprising a lever, allows said single pawl to re-engage said teeth to arrest movement of said carriage.

43. A proportional spacing mechanism consisting of an escapement member, a combination stop and feed pawl mechanism pivotally mounted on and engageable and disengageable with said escapement member, a type bar means to disengage said stop and feed pawl mechanism from engagement with said escapement member, a second means to lock said stop and feed pawl mechanism in disengaged position, and a plurality of selector stops under control of said type bar means to selectively position a selector stop in operative position for engagement by said stop and feed pawl mechanism to actuate said second means to unlock said stop and feed pawl mechanism and cause re-engagement of said stop and feed pawl mechanism with said escapement member.

44. In a proportional spacing typewriter, a carriage, means to drive the carriage in a letter spacing direction, type keys, type bars, power means controlled by said type keys and operatively connected to said type bars to drive said type bars, selectively operable carriage feed mechanism for feeding the carriage variable extents according to the widths of the characters type and under the influence of said means to drive the carriage including an escapement wheel, pawl mechanism pivotally mounted on and engaging and disengaging the escapement wheel to effect feeding the carriage variable extents, a first means controlled by said type bars to disengage said pawl mechanism from engagement with said escapement wheel, a second means to lock said pawl mechanism in disengaged position, and selecting means controlled by said type bar driving means for selectively engaging said pawl mechanism, said selecting means being selectively settable to effect a multiple number of different space values of feed of the carriage through said pawl mechanism, each space value of feed being variable according to the width of the character typed, said selecting means upon engagement by said pawl mechanism actuating said second means to unlock said pawl mechanism to cause re-engagement of said pawl mechanism with said escapement wheel.

45. In a typewriter, a carriage, a spring motor urging said carriage in one direction, a rack fixed to said carriage, a rotatable shaft having a pinion meshing with said rack, a continuously revolving shaft, a cam, a carriage return key actuated to cause said cam to engage said shaft, an electric motor, a clutch operably connected to said cam to cause said clutch to engage said electric motor, a clevis rod connected on one end to said clutch, an escapement wheel having teeth fixed for rotation with said shaft, a pawl mechanism combining stop and feed control, through said spring motor, of said escapement wheel through engagement and disengagement with said teeth, a permanent stop, said pawl mechanism normally engaging said teeth and holding said carriage at rest against the urging of said spring motor by engaging said permanent stop, a tabulator bar, a carriage return link, a blade lever, the other end of said clevis rod engaging said blade lever, a margin stop provided with a stop guide, and a base, a feed pawl disengaging lever, a first means connecting said blade lever with said feed pawl disengaging lever whereby said clutch through said clevis rod and said blade lever actuates said feed pawl disengaging lever to disengage said pawl mechanism from engagement with said teeth to allow said clutch to cause said electric motor to move said carriage in a direction opposite to the direction of movement of said carriage under the influence of said spring motor, said carriage under the influence of said electric motor causing said base to engage said tabulator bar and said stop guide to engage said safety bumper link whereby a second means connected to said link actuates said blade lever and through said clevis rod disengages said clutch from said electric motor, said second means also actuating said first means to disengage said feed pawl disengaging lever from engagement with said pawl mechanism whereby said pawl mechanism re-engages said teeth on said escapement wheel, said tabulator bar limiting the movement of said carriage in the electric motor driven direction.

46. A claim the same as claim 45 being further characterized in that: a safety bumper link, pivotally connected to said tabulator bar, normally lies interposed between said margin stop and said tabulator bar, said first means actuating said safety bumper link to pivot said margin control link out of the path of travel of said margin stop, said second means actuating said first means to permit said safety bumper link to pivot into position between said tabulator bar and said margin stop.

47. A device for controlling the movement of a typewriter carriage in accordance with the character key operated, comprising drive means operatively connected to said carriage for moving said carriage in a letter feeding direction, means operatively connected to said carriage for limiting the movement thereof, said last-mentioned means including a gear wheel operatively connected to said carriage, a plurality of actuable members operatively connected to preselected groups of the character keys for determining different extents of feed of the carriage, pawl mechanism directly carried on said gear wheel and movable therewith in one direction to a fixed position in which the movement of said carriage is arrested and movable independently of said gear wheel in an opposite direction into a position with respect to one of said actuable members and in which position said pawl mechanism engages said gear wheel, resilient means for moving said pawl mechanism in said opposite direction, and means operatively connected to said pawl mechanism and to said actuable members and actuated by any one of said character keys for disengaging said pawl mechanism from said gear wheel when in said fixed position and for positioning the actuable member corresponding to the character key operated in position with respect to said pawl mechanism, for determining the extent of carriage movement.

48. A device for controlling the movement of a typewriter carriage in accordance with the character key operated comprising drive means operatively connected to said carriage for moving said carriage in a letter feeding direction, means operatively connected to said carriage for limiting the movement thereof, said last-mentioned means including a driven member operatively connected to said carriage, a plurality of actuable members operatively connected to preselected groups of the character keys for determining different extents of feed of the carriage, means for supporting said actuable members in a normal position, control means mounted with respect to said driven member and movable therewith in one direction to a fixed position in which the movement of said carriage is arrested and movable independently of said driven member in an opposite direction into a position with respect to one of said actuable members and in which position said control means engages said driven member, resilient means for moving said control means in said opposite direction, means operatively connected to said control means and to said actuable members and actuated by any one of said character keys for disengaging said control means from said driven member when in said fixed position and for positioning the actuable member corresponding to the character key operated in position with respect to said control means for determining the extent of carriage movement, and means operatively connected to said support means for said actuable members and actuated independently of said character keys for moving said actuable members from said normal position into a position in which the extent of feed of each actuable member is increased by the same predetermined amount.

49. A device for controlling the movement of a typewriter carriage in accordance with the character key operated comprising drive means operatively connected to said carriage for moving said carriage in a letter feeding direction, means operatively connected to said carriage for limiting the movement thereof, said last-mentioned means including a driven member operatively connected to said carriage, a plurality of actuable members operatively connected to preselected groups of the character keys for determining different extents of feed of the carriage, means for supporting said actuable members in a normal position, control means mounted with respect to said driven member and movable therewith in one direction to a fixed stop in which the movement of said carriage is arrested and movable independently of said driven member in an opposite direction into a position with respect to one of said actuable members and in which position said control means engages said driven member, resilient means for moving said control means in said opposite direction, means operatively connected to said control means and to said actuable members and actuated by any one of said character keys for disengaging said control means from said driven member when in said fixed position and for positioning the actuable member corresponding to the character key operated in position with respect to said control means for determining the extent of carriage movement, means operatively connected to said support means for said actuable members and actuated independently of said character keys for moving said actuable members from said normal position into a position in which the extent of feed of each actuable member is increased by the same predetermined amount and means associated with said control means and operable independently of said character keys to disengage said control means from said driven member when in said fixed position for rendering said drive means operative.

50. In a machine having a carriage member adapted to execute tabulating runs on a frame member, the combination with a stop element on one of said members, of a tabulator bar on the other member projectable into tabulation limiting range with said stop element and upon projection being slightly displaceable by engagement with said stop element during an ensuing tabulating run of the carriage, an escapement member, a combination stop and feed pawl engageable and disengageable with said escapement member, a feed pawl disengaging lever, means to actuate said feed pawl disengaging lever to disengage said combination stop and feed pawl from engagement with said escapement member, a second means to lock said feed pawl disengaging lever in position to hold said combination stop and feed pawl in disengaged position with said escapement member, a tabulator bell crank lever being located so as to be actuated by said stop element, a third means under control of said tabulator bell crank lever to release said locking means, and a resilient means to return said feed pawl disengaging lever to a position to allow said combination stop and feed pawl to re-engage said escapement member.

51. In a proportional spacing mechanism for typewriters, including a single pawl normally engaged with a toothed member for holding the carriage of the typewriter against movement in letter-feeding direction, means for disengaging said pawl from the toothed member, means for latching said pawl against re-engagement with said toothed member, a set stop of a group of settable stops, means for moving said pawl along the toothed member until said pawl contacts said set stop, means for unlatching said pawl on contacting said set stop, and spring means for causing said pawl when unlatched to re-engage said toothed member and to hold said pawl in engagement with said toothed member as the carriage and toothed member move in letter-feeding direction, thereby returning said pawl to its starting position.

52. A typewriter escapement structure having a single pawl normally in engagement with a toothed member to hold the carriage in any set selector position, stops to limit the movement of the carriage, means for disengaging said pawl, means for latching the pawl out of said engagement, means for moving the pawl against any selector stop, means for unlatching the pawl and spring means for then causing the pawl to re-engage the toothed member to permit the carriage movement to bring the pawl back to its original position.

53. In a proportional spacing typewriter, a carriage, type keys for hand operation, type bars to be operated by electric power means, means operatively connected to said type bars, to drive said type bars, a selectively operable carriage feed mechanism for feeding the carriage variable extents according to the widths of the typing characters, including a complete circular member having uniform teeth around the periphery, a single pawl pivotally mounted directly on said member, means to cause said single pawl to engage and disengage said teeth on said circular member to effect feeding the carriage variable extents, means to lock said pawl in disengaged tooth position and to unlock said single pawl to engage said teeth, selecting means for selectively engaging said single pawl to effect the unlocking of said single pawl from locked position, and means for then holding the pawl in unlocked position until reengagement is required, said selecting means being selectable to effect varying degrees of feed of the carriage through said single pawl, each degree of feed being variable according to the widths of characters typed.

54. A typewriter having an escapement comprising a toothed wheel and a pawl unit of closely associated parts all carried on said wheel, one of said parts being movable relative to the others for directly controlling the letter feeding movement of said wheel, said movable part having means for operatively engaging the teeth on said wheel, and means for disengaging said last named means for permitting movement in a direction opposite to said letter feeding movement, one of said other parts latching said movable part in disengaged position, said other part having means for engaging a stop member for unlatching said movable part to permit said tooth engaging means to re-engage said toothed wheel for carrying said pawl unit back to starting position in a letter feed direction.

55. In a typewriter having a frame and a carriage mounted thereon for travel in two directions, the combination with settable tabulation stops on said carriage and tabulating terminating means on said frame, of an escapement wheel geared to said carriage, a single pawl, a fixed stop, selectively settable stop members, said pawl engaging said wheel and abutting said fixed stop thereby restraining carriage movement in one direction, said pawl adapted when disengaged to move peripherally about said wheel to a selected stop member whereat it reengages and returns with said wheel to said fixed stop thereby determining the extent of carriage movement in one direction, means responsive to initiation of a tabulation operation for disengaging said pawl and for latching it against peripheral movement whereby said carriage is freed for movement in one direction, said tabulation terminating means comprising first means projectable into the path of set tabulator stops for arresting carriage movement and second means projectable into the path of said set tabulator stops, said second means being effective upon arrest of said carriage by said first means to effect the reengagement of said pawl thereby establishing the position of said carriage after a tabulation operation.

56. In a typewriter having a frame and a carriage mounted thereon for travel in a letter feed and return directions, the combination with a left hand margin stop on said carriage and carriage return terminating means on said frame, of an escapement wheel geared to said carriage, a single pawl, a fixed stop, selectively settable stop members, said pawl engaging said wheel and abutting said fixed stop thereby restraining carriage movement in one direction, said pawl adapted when disengaged to move peripherally about said wheel to a selected stop member whereat it reengages and returns with said wheel to said fixed stop thereby determining the extent of carriage movement in one direction, means responsive to initiation of a carriage return operation for effecting the disengagement of said pawl, means for latching said pawl against peripheral movement whereby said carriage is free to move, a normally idle power return means, means to render said return means effective, said carriage return terminating means comprising first means disposed in the path of said margin stop adapted to arrest movement of said carriage in carriage return direction, and second means disposed in the path of said margin stop adapted in response to carriage return movement to render said power return means ineffective and to condition said pawl for reengagement with said wheel, said second means being responsive to a predetermined movement of the carriage in letter feed direction after its arrest in carriage return direction for effecting reengagement of said pawl with said wheel thereby positioning the carriage after a carriage return operation.

References Cited in the file of this patent

UNITED STATES PATENTS

| | | |
|---|---|---|
| 585,235 | Sears | June 29, 1897 |
| 1,837,898 | Crumrine | Dec. 22, 1931 |
| 2,111,410 | Stickney | Mar. 15, 1938 |
| 2,211,911 | Reid | Aug. 20, 1940 |
| 2,258,116 | Khalil | Oct. 7, 1941 |
| 2,303,878 | Helmond | Dec. 1, 1942 |
| 2,581,200 | Norton | Jan. 1, 1952 |